United States Patent
Sato

(10) Patent No.: US 7,099,756 B2
(45) Date of Patent: Aug. 29, 2006

(54) MOTOR DRIVE APPARATUS, HYBRID VEHICLE DRIVE APPARATUS USING THE SAME, AND COMPUTER READABLE RECORDING MEDIUM RECORDED WITH PROGRAM FOR CAUSING COMPUTER TO PERFORM CONTROL OF MOTOR DRIVE APPARATUS

(75) Inventor: Eiji Sato, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 29 days.

(21) Appl. No.: 10/530,514

(22) PCT Filed: Jul. 10, 2003

(86) PCT No.: PCT/JP03/08810

§ 371 (c)(1),
(2), (4) Date: Apr. 7, 2005

(87) PCT Pub. No.: WO2004/082122

PCT Pub. Date: Sep. 23, 2004

(65) Prior Publication Data

US 2006/0052915 A1   Mar. 9, 2006

(30) Foreign Application Priority Data

Mar. 11, 2003   (JP) .............................. 2003-65360

(51) Int. Cl.
*B60K 1/00* (2006.01)

(52) U.S. Cl. ...................... 701/22; 180/65.2; 180/65.8; 318/801

(58) Field of Classification Search .................... 701/1, 701/22, 36; 290/7, 50; 322/28; 320/117, 320/118; 307/45, 46, 47; 180/65.1–65.8; 318/375, 376, 139, 140, 801
See application file for complete search history.

(56) References Cited

U.S. PATENT DOCUMENTS

| | | | |
|---|---|---|---|
| 5,373,195 A | 12/1994 | De Doncker et al. | |
| 5,796,175 A | 8/1998 | Itoh et al. | |
| 6,371,089 B1 | 4/2002 | Matsuoka et al. | |
| 6,608,396 B1 * | 8/2003 | Downer et al. ........... | 290/40 C |
| 6,653,745 B1 | 11/2003 | Masaki et al. | |
| 6,674,180 B1 * | 1/2004 | Gale et al. ..................... | 290/7 |
| 6,889,126 B1 * | 5/2005 | Komiyama et al. ........... | 701/22 |
| 6,907,948 B1 * | 6/2005 | Wakashiro et al. ......... | 180/65.2 |
| 6,920,948 B1 * | 7/2005 | Sugiura et al. ............. | 180/65.2 |
| 6,932,176 B1 * | 8/2005 | Takami et al. ............. | 180/65.2 |
| 2001/0041952 A1 | 11/2001 | Nada | |
| 2003/0067278 A1 | 4/2003 | Nakamaura et al. | |
| 2003/0081440 A1 | 5/2003 | Komatsu et al. | |
| 2004/0145338 A1 | 7/2004 | Nakamura et al. | |

FOREIGN PATENT DOCUMENTS

EP   1 034 968 A1   9/2000

(Continued)

Primary Examiner—Richard M. Camby
(74) Attorney, Agent, or Firm—Oliff & Berridge, PLC

(57) ABSTRACT

Upon detection of a fault in a DC power supply based on a voltage from a voltage sensor or a temperature from a temperature sensor, a control device controls inverters to cause AC motors to output zero output torque, and generates and outputs signals to a voltage step-up converter and a DC/DC converter, respectively. The control device generates and outputs a signal SE of an L level to system relays to cut off the system relays. Thereafter, the control device generates and outputs a signal PWMDL to the voltage step-up converter to switch control of the voltage step-up converter to voltage step-down control.

15 Claims, 10 Drawing Sheets

| | FOREIGN PATENT DOCUMENTS | | JP | A 10-271603 | 10/1998 |
|---|---|---|---|---|---|
| | | | JP | A 11-4507 | 1/1999 |
| EP | 1 157 873 A2 | 11/2001 | JP | A 2001-25103 | 1/2001 |
| EP | 1 219 493 A1 | 7/2002 | JP | A-2001-268702 | 9/2001 |
| JP | A-06-255402 | 9/1994 | JP | A 2003-61209 | 2/2003 |
| JP | A 7-87614 | 3/1995 | WO | WO 01/21431 A1 | 3/2001 |
| JP | A 7-193989 | 7/1995 | | | |
| JP | A 8-214592 | 8/1996 | * cited by examiner | | |
| JP | A-09-046921 | 2/1997 | | | |

MOTOR DRIVE APPARATUS, HYBRID VEHICLE DRIVE APPARATUS USING THE SAME, AND COMPUTER READABLE RECORDING MEDIUM RECORDED WITH PROGRAM FOR CAUSING COMPUTER TO PERFORM CONTROL OF MOTOR DRIVE APPARATUS

TECHNICAL FIELD

The present invention relates to a motor drive apparatus driving a motor, a hybrid vehicle drive apparatus using the same, and a computer readable recording medium recorded with a program for causing a computer to perform control of the motor drive apparatus.

BACKGROUND ART

Hybrid vehicles have recently been of great interest as environment-friendly vehicles. Some hybrid vehicles have come into practical use.

A hybrid vehicle includes, as its motive power sources, a DC (direct current) power supply, an inverter and a motor driven by the inverter, in addition to a conventional engine. Specifically, the engine is driven to generate motive power, and at the same time, a DC voltage from the DC power supply is converted to an AC (alternating current) voltage by the inverter to rotate the motor with the thus-converted AC voltage to thereby obtain motive power.

For the hybrid vehicle, it has been studied to boost a DC voltage from the DC power supply with a voltage step-up converter, and supply the boosted DC voltage to two inverters driving two motors, respectively.

In this regard, the hybrid vehicle is mounted with a motor drive apparatus as shown in FIG. 10. Referring to FIG. 10, the motor drive apparatus 300 includes a DC power supply B, system relays SR1, SR2, capacitors C1, C2, a bidirectional converter 310, a voltage sensor 320, and inverters 330, 340.

DC power supply B outputs a DC voltage. System relays SR1, SR2, when turned on by a control device (not shown), supply the DC voltage from DC power supply B to capacitor C1. Capacitor C 1 smoothes the DC voltage supplied from DC power supply B via system relays SR1, SR2, and supplies the smoothed DC voltage to bidirectional converter 310.

Bidirectional converter 310 includes a reactor 311, NPN transistors 312, 313, and diodes 314, 315. Reactor 311 has one end connected to a power supply line of DC power supply B, and another end connected to an intermediate point between NPN transistors 312 and 313, i.e., between an emitter of NPN transistor 312 and a collector of NPN transistor 313. NPN transistors 312, 313 are connected in series between a power supply line and a ground line. NPN transistor 312 has its collector connected to the power supply line, and NPN transistor 313 has its emitter connected to the ground line. Diodes 314, 315 are each arranged between the collector and the emitter of corresponding one of NPN transistors 312, 313 to cause the current to flow from the emitter side to the collector side.

Bidirectional converter 310, with NPN transistors 312, 313 turned on/off by a control device (not shown), boosts the DC voltage supplied from capacitor C 1, and supplies the output voltage to capacitor C2. In a regenerative braking mode of the hybrid vehicle mounted with motor drive apparatus 300, bidirectional converter 310 down-converts the DC voltage generated by AC motor M1 or M2 and converted by inverter 330 or 340, and supplies the resulting voltage to capacitor C1.

Capacitor C2 smoothes the DC voltage supplied from bidirectional converter 310, and supplies the smoothed DC voltage to inverters 330, 340. Voltage sensor 320 detects a terminal-to-terminal voltage of capacitor C2, i.e., an output voltage Vm of bidirectional converter 310.

Inverter 330, when supplied with a DC voltage from capacitor C2, converts the DC voltage to an AC voltage based on control from a control device (not shown), to drive AC motor M1. As such, AC motor M1 is driven to generate torque designated by a torque command value. Inverter 340, in receipt of a DC voltage from capacitor C2, converts the DC voltage to an AC voltage based on control from a control device (not shown), to drive AC motor M2. AC motor M2 is driven to generate torque designated by a torque command value.

Further, in the regenerative braking mode of the hybrid vehicle mounted with motor drive apparatus 300, inverter 330 converts an AC voltage generated by AC motor M1 to a DC voltage based on control from a control device, and supplies the converted DC voltage to bidirectional converter 310 via capacitor C2. In the regenerative braking mode of the hybrid vehicle, inverter 340 converts an AC voltage generated by AC motor M2 to a DC voltage based on control from a control device, and supplies the converted DC voltage to bidirectional converter 310 via capacitor C2.

Meanwhile, a system provided with a battery, a motor, and an electric power generator is disclosed in Japanese Patent Laying-Open No. 7-87614. This system is applied to a hybrid vehicle. In this system, the motor and the electric power generator are connected to the battery. The motor is driven by a battery voltage from the battery, and the electric power generator supplies generated electric power to an inverter driving the motor and to the battery. In an abnormal event of the battery where capacitance of the battery decreases and the motor cannot output a required torque, for example, the motor and the electric power generator are disconnected from the battery, and the motor is driven by the electric power generated by the electric power generator.

However, if the technique disclosed in Japanese Patent Laying-Open No. 7-87614 is applied when there is a fault in DC power supply B of motor drive apparatus 300, an overvoltage will be applied to the DC/DC converter connected between system relays SR1, SR2 and bidirectional converter 310, causing an unfavorable situation. In this case, increasing the withstand voltage of the DC/DC converter will lead to a cost increase. Further, when system relays SR1, SR2 are cut off while bidirectional converter 310 is conducting a switching operation, a ripple current may blow the contact points of system relays SR1, SR2.

DISCLOSURE OF THE INVENTION

In view of the foregoing, an object of the present invention is to provide a motor drive apparatus that prevents an overvoltage from being applied to an electric load connected to a primary side of a voltage converter conducting voltage conversion, in the event of a fault of a DC power supply.

Another object of the present invention is to provide a motor drive apparatus that cuts off a relay to prevent meltdown upon a fault of a DC power supply.

A further object of the present invention is to provide a hybrid vehicle drive apparatus that prevents an overvoltage from being applied to an electric load connected to a primary side of a voltage converter conducting voltage conversion, in the event of a fault of a DC power supply.

A still further object of the present invention is to provide a hybrid vehicle drive apparatus that cuts off a relay to prevent meltdown upon a fault of a DC power supply.

Yet another object of the present invention is to provide a computer readable recording medium recorded with a program for causing a computer to perform control of a motor drive apparatus so as to prevent an overvoltage from being applied to an electric load connected to a primary side of a voltage converter conducting voltage conversion, in the event of a fault of a DC power supply.

Yet another object of the present invention is to provide a computer readable recording medium recorded with a program for causing a computer to perform control of a motor drive apparatus so as to cut off a relay to prevent meltdown upon a fault of a DC power supply.

According to the present invention, a motor drive apparatus includes first and second inverters, a DC power supply, a voltage converter, a relay, an electric load, and a control device. The first inverter drives a first motor. The second inverter drives a second motor. The DC power supply outputs a DC voltage. The voltage converter boosts and supplies the DC voltage from the DC power supply to the first and second inverters, and down-converts and supplies the DC voltage from the first or second inverter to the side of the DC power supply. The relay is connected between the DC power supply and the voltage converter. The electric load is connected between the relay and the voltage converter. The control device cuts off the relay and switches control of the voltage converter to voltage step-down control in response to detection of a fault in the DC power supply.

Preferably, the control device controls the first and second inverters to cause a total sum of first energy at the first motor and second energy at the second motor to be zero, and cuts off the relay when the electric load and the voltage converter are stopped.

Preferably, the control device controls the first and second inverters to cause the first and second energies to be zero.

Preferably, the control device sets a duty ratio with which a primary voltage of the voltage converter corresponding to its voltage on the side of the DC power supply is not greater than an upper limit, to switch the control of the voltage converter to the voltage step-down control.

Preferably, the upper limit corresponds to a withstand voltage of parts of the electric load.

Preferably, the control device sets a duty ratio with which the primary voltage falls within a range of an operating voltage of the electric load, to switch the control of the voltage converter to the voltage step-down control.

Preferably, the range of the operating voltage has a lower limit and the upper limit, and when the primary voltage is lower than the lower limit, the control device controls the first and second inverters to cause a total sum of the first energy and the second energy to be regenerative energy.

Preferably, the electric load is a DC/DC converter that converts and supplies the DC voltage from the DC power supply to an auxiliary battery.

According to the present invention, a hybrid vehicle drive apparatus is for driving a hybrid vehicle, and includes an internal combustion engine, first and second motors, and a motor drive apparatus. The first motor is connected to the internal combustion engine. The motor drive apparatus is according to any of claims 1–8. The motor drive apparatus drives the first and second motors. The control device drives the first and second inverters so as to drive the second motor by electric power generated by the first motor in accordance with a running mode of the hybrid vehicle.

Further, according to the present invention, a computer readable recording medium recorded with a program to be executed by a computer is a computer readable recording medium recorded with a program for causing a computer to perform control of a motor drive apparatus in the event of a fault in a DC power supply. The motor drive apparatus includes a first inverter driving a first motor, a second inverter driving a second motor, a DC power supply outputting a DC voltage, a voltage converter boosting and supplying the DC voltage from the DC power supply to the first and second inverters and down-converting and supplying the DC voltage from the first or second inverter to the side of the DC power supply, a relay connected between the DC power supply and the voltage converter, and an electric load connected between the relay and the voltage converter.

The program causes the computer to perform a first step of detecting a fault in the DC power supply, a second step of cutting off the relay in response to detection of the fault in the DC power supply, and a third step of switching control of the voltage converter to voltage step-down control in response to cutting off of the relay.

Preferably, the second step includes a first sub-step of controlling the first and second inverters to cause a total sum of first energy at the first motor and second energy at the second motor to be zero, a second sub-step of stopping the voltage converter, a third sub-step of stopping the electric load, and a fourth sub-step of cutting off the relay after completion of the first, second and third sub-steps.

Preferably, the first sub-step causes the first and second energies to be zero.

Preferably, the third step includes a fifth sub-step of calculating a duty ratio for setting a primary voltage of the voltage converter corresponding to its voltage on the side of the DC power supply to not greater than an upper limit, and a sixth sub-step of controlling the voltage converter based on the calculated duty ratio.

Preferably, the fifth sub-step calculates the duty ratio with which the primary voltage falls within a range of an operating voltage of the electric load.

Preferably, the range of the operating voltage has a lower limit and the upper limit. The third step further includes a seventh sub-step of determining whether the primary voltage is not greater than the lower limit, and an eighth sub-step of controlling the first and second inverters to cause a total sum of the first and second energies to be regenerative energy when the primary voltage is not greater than the lower limit.

In the present invention, upon detection of a fault of the DC power supply, the relay is cut off, and control of the voltage converter is switched to voltage step-down control. The relay is cut off in the state where there is no DC current flowing between the DC power supply and the voltage converter.

Thus, according to the present invention, it is possible to prevent an overvoltage from being applied to the electric load connected to the primary side of the voltage converter. It is also possible to prevent meltdown and adhesion or degradation of the contact point of the relay.

BEST MODES FOR CARRYING OUT THE INVENTION

Figure 1:
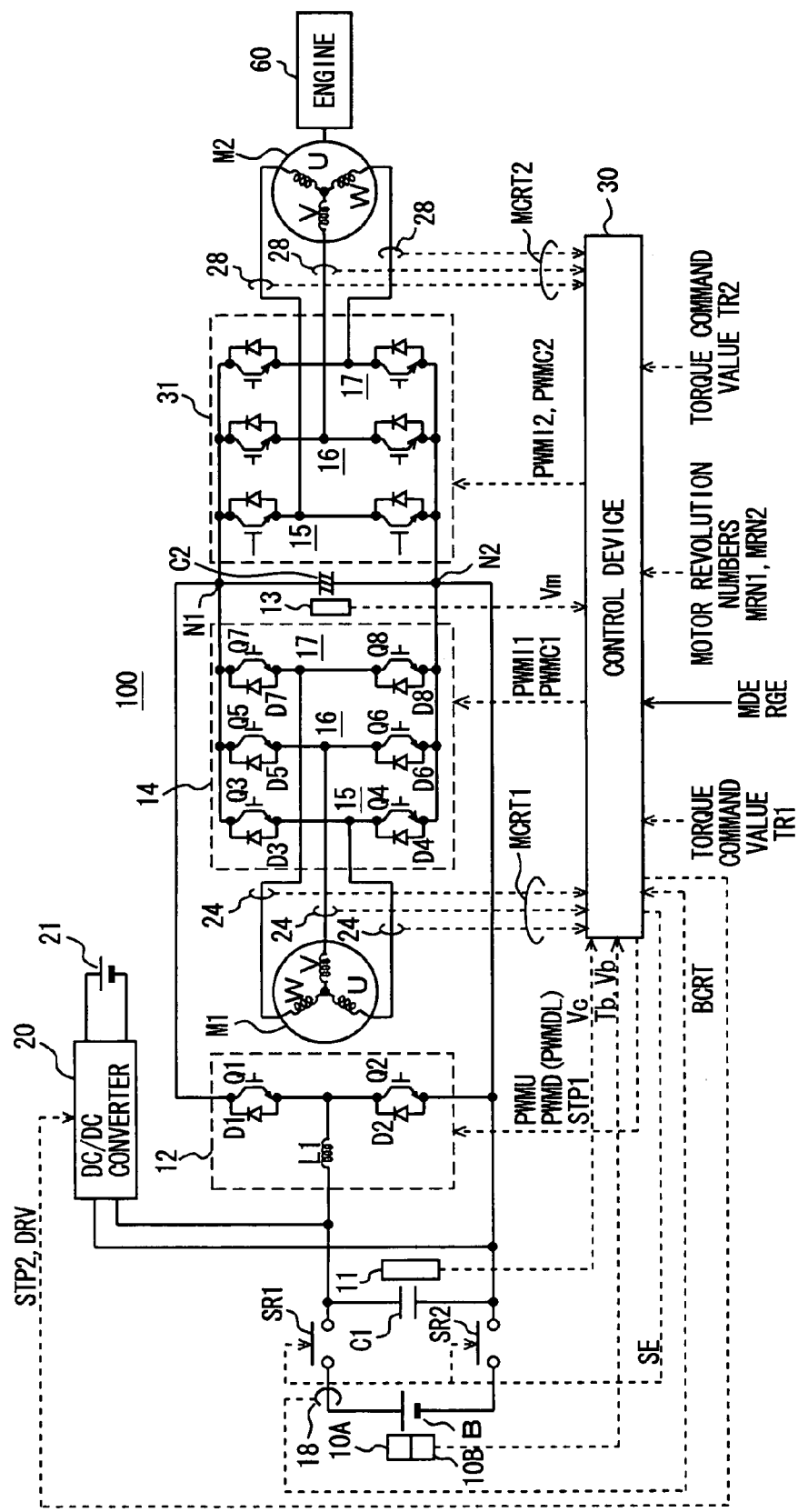
FIG. 1 is a schematic block diagram of a hybrid vehicle drive apparatus according to an embodiment of the present invention.

Hereinafter, embodiments of the present invention will be described in detail with reference to the drawings. In the drawings, the same or corresponding portions are denoted by the same reference characters, and description thereof will not be repeated.

Referring to FIG. 1, a hybrid vehicle drive apparatus 100 mounted with a motor drive apparatus according to an embodiment of the present invention includes a DC power supply B, voltage sensors 10A, 11, 13, a temperature sensor 10B, system relays SR1, SR2, capacitors C1, C2, a voltage step-up converter 12, inverters 14, 31, current sensors 18, 24, 28, a DC/DC converter 20, an auxiliary battery 21, a control device 30, an engine 60, and AC motors M1, M2.

AC motor M1 is a drive motor for generating torque for driving drive wheels of the hybrid vehicle. AC motor M2 is a motor that can function as an electric power generator driven by the engine and also function as an electric motor for the engine to start the engine for example.

Voltage step-up converter 12 includes a reactor L1, NPN transistors Q1, Q2, and diodes D1, D2. Reactor L1 has one end connected to a power supply line of DC power supply B, and the other end connected to an intermediate point between NPN transistors Q1 and Q2, i.e., between an emitter of NPN transistor Q1 and a collector of NPN transistor Q2. NPN transistors Q1, Q2 are connected in series between a power supply line and a ground line. The collector of NPN transistor Q1 is connected to the power supply line, and the emitter of NPN transistor Q2 is connected to the ground line. Each of diodes D1, D2 is connected between the collector and the emitter of corresponding one of NPN transistors Q1, Q2, to cause a current to flow from the emitter side to the collector side.

Inverter 14 is formed of an U phase arm 15, a V phase arm 16, and a W phase arm 17, which are arranged in parallel between the power supply line and the ground line.

U phase arm 15 is formed of NPN transistors Q3, Q4 connected in series, V phase arm 16 is formed of NPN transistors Q5, Q6 connected in series, and W phase arm 17 is formed of NPN transistors Q7, Q8 connected in series. Each of diodes D3–D8 is connected between a collector and an emitter of corresponding one of NPN transistors Q3–Q8, to cause a current to flow from the emitter side to the collector side.

Each phase arm has its intermediate point connected to an end of corresponding one of phase coils constituting AC motor M1. More specifically, AC motor M1 is a three-phase permanent-magnetic motor, with three coils of U, V and W phases each having one end commonly connected to a center point. The U phase coil has the other end connected to the intermediate point of NPN transistors Q3, Q4, the V phase coil has the other end connected to the intermediate point of NPN transistors Q5, Q6, and the W phase coil has the other end connected to the intermediate point of NPN transistors Q7, Q8.

Inverter 31 has a configuration similar to that of inverter 14. The intermediate point of each phase arm of inverter 31 is connected to an end of the corresponding phase coil of AC motor M2. That is, AC motor M2 is also a three-phase permanent-magnetic motor as is AC motor M1, and its three coils of U, V and W phases have their one ends commonly connected to a center point, and the other ends connected to the intermediate points of NPN transistors Q3, Q4, of NPN transistors Q5, Q6, and of NPN transistors Q7, Q8, respectively.

DC/DC converter 20 is connected in parallel with capacitor C1 and voltage step-up converter 12 between system relays SR1, SR2 and voltage step-up converter 12.

DC power supply B is formed of a secondary battery of nickel-hydrogen, lithium-ion or the like. Voltage sensor 10A detects a voltage Vb output from DC power supply B, and outputs the detected voltage Vb to control device 30. Temperature sensor 10B detects a temperature Tb of DC power supply B, and outputs the detected temperature Tb to control device 30. System relays SR1, SR2 are turned on/off by a signal SE from control device 30. More specifically, system relays SR1, SR2 are turned on by signal SE of an H (logical high) level from control device 30, and turned off by signal SE of an L (logical low) level from control device 30.

Capacitor C1 smoothes a DC voltage supplied from DC power supply B, and supplies the smoothed DC voltage to voltage step-up converter 12 and to DC/DC converter 20. Voltage sensor 11 detects a terminal-to-terminal voltage Vc of capacitor C1, and outputs the detected voltage Vc to control device 30.

Voltage step-up converter 12 boosts a DC voltage supplied from capacitor C1 and supplies the boosted voltage to capacitor C2. More specifically, in receipt of a signal PWMU from control device 30, voltage step-up converter 12 boosts the DC voltage in accordance with a time period during which NPN transistor Q2 is on by signal PWMU, and supplies the boosted voltage to capacitor C2. In this case, NPN transistor Q1 is turned off by signal PWMU.

Voltage step-up converter 12, in receipt of a signal PWMD from control device 30, down-converts a DC voltage supplied from inverter 14 (or 31) via capacitor C2, and supplies the resulting voltage to DC power supply B and to DC/DC converter 20.

Further, voltage step-up converter 12 stops the voltage step-up and step-down operations in response to a signal STP1 from control device 30.

Capacitor C2 receives a DC voltage from voltage step-up converter 12 via nodes N1, N2. Capacitor C2 smoothes the received DC voltage, and supplies the smoothed DC voltage to inverters 14, 31. Voltage sensor 13 detects a terminal-to-terminal voltage Vm of capacitor C2 (which corresponds to the output voltage of voltage step-up converter 12=the input voltage to inverters 14, 31; the same applies to the description below), and outputs the detected voltage Vm to control device 30.

Inverter 14, when receiving a DC voltage from capacitor C2, converts the DC voltage to an AC voltage based on a signal PWMI1 from control device 30, to drive AC motor M1. Accordingly, AC motor M1 is driven to generate torque designated by a torque command value TR1. In the regenerative braking mode of the hybrid vehicle mounted with hybrid vehicle drive apparatus 100, inverter 14 converts an AC voltage generated by AC motor M1 to a DC voltage based on a signal PWMC1 from control device 30, and supplies the converted DC voltage to voltage step-up converter 12 via capacitor C2.

Inverter 31, when receiving a DC voltage from capacitor C2, converts the DC voltage to an AC voltage based on a signal PWMI2 from control device 30, to drive AC motor M2. Accordingly, AC motor M2 is driven to generate torque designated by a torque command value TR2. In the regenerative braking mode of the hybrid vehicle mounted with hybrid vehicle drive apparatus 100, inverter 31 converts an AC voltage generated by AC motor M2 to a DC voltage based on a signal PWMC2 from control device 30, and supplies the converted DC voltage to voltage step-up converter 12 via capacitor C2.

Herein, the regenerative braking includes braking accompanied by regenerative power generation that is effected when a driver of the hybrid vehicle steps on the foot brake, as well as deceleration (or stop of acceleration) accompanied by regenerative power generation that is effected when the driver releases the accelerator pedal without operating the foot brake.

Current sensor 18 detects a current BCRT at the time of charging/discharging DC power supply B, and outputs the detected current BCRT to control device 30.

DC/DC converter 20 is driven by a signal DRV from control device 30, and converts a DC voltage from DC power supply B to charge auxiliary battery 21. DC/DC converter 20 is stopped by a signal STP2 from control device 30. Auxiliary battery 21 stores the electric power supplied from DC/DC converter 20.

Current sensor 24 detects a motor current MCRT1 flowing through AC motor M1, and outputs the detected motor current MCRT1 to control device 30. Current sensor 28 detects a motor current MCRT2 flowing through AC motor M2, and outputs the detected motor current MCRT2 to control device 30.

Control device 30 receives torque command values TR1, TR2, motor revolution numbers MRN1, MRN2 and signals MDE, RGE from an externally provided ECU (Electrical Control Unit). Control device 30 also receives voltage Vb from voltage sensor 10A, voltage Vc from voltage sensor 11, voltage Vm from voltage sensor 13, motor current MCRT1 from current sensor 24, and motor current MCRT2 from current sensor 28. Control device 30 generates signal PWMI1, based on voltage Vm, motor current MCRT1 and torque command value TR1, for controlling switching of NPN transistors Q3–Q8 of inverter 14 when inverter 14 drives AC motor M1 in a manner as will be described later, and outputs the generated signal PWMI1 to inverter 14.

Control device 30 also generates signal PWMI2, based on voltage Vm, motor current MCRT2 and torque command value TR2, for controlling switching of NPN transistors Q3–Q8 of inverter 31 when inverter 31 drives AC motor M2 in a manner as will be described later, and outputs the generated signal PWMI2 to inverter 31.

Further, control device 30, based on voltages Vb, Vm, torque command value TR1 (or TR2) and motor revolution number MRN1 (or MRN2), generates signal PWMU for controlling switching of NPN transistors Q1, Q2 of voltage step-up converter 12 in a manner as will be described later when inverter 14 (or 31) drives AC motor M1 (or M2), and outputs the generated signal PWMU to voltage step-up converter 12.

Still further, control device 30 determines whether there is a fault in DC power supply B based on voltage Vb (both voltage Vb and current BCRT may be used, the same applies to the description below) or temperature Tb. If there is a fault in DC power supply B, control device 30 cuts off system relays SR1, SR2 and switches control of voltage step-up converter 12 to voltage step-down control to prevent application of an overvoltage to DC/DC converter 20, in a manner as will be described later. Control device 30 uses a signal MDE from the external ECU upon switching to the voltage step-down control. The switching to the voltage step-down control will be described later in detail.

In regenerative braking of the hybrid vehicle mounted with hybrid vehicle drive apparatus 100, when control device 30 receives signal RGE from the external ECU indicating that the hybrid vehicle has entered the regenerative braking mode, it generates signals PWMC1, PWMC2 for converting an AC voltage generated by AC motor M1 or M2 to a DC voltage, and outputs the generated signals PWMC1, PWMC2 to inverters 14, 31, respectively. In this case, NPN transistors Q3–Q8 of inverters 14, 31 undergo switching control by signals PWMC1, PWMC2. Accordingly, inverter 14 converts the AC voltage generated by AC motor M1 to the DC voltage and supplies the converted voltage to voltage step-up converter 12, and inverter 31 converts the AC voltage generated by AC motor M2 to the DC voltage and supplies the converted voltage to voltage step-up converter 12.

Further, when receiving signal RGE from the external ECU, control device 30 generates signal PWMD for down-converting the DC voltage supplied from inverter 14, and outputs the generated signal PWMD to voltage step-up converter 12. Accordingly, the AC voltage generated by AC motor M1 or M2 is converted to the DC voltage and then down-converted, before being supplied to DC power supply B and to DC/DC converter 20.

Engine 60 is connected with AC motor M2. While engine 60 is started by AC motor M2, it rotates a rotor (not shown) of AC motor M2.

Figure 2:
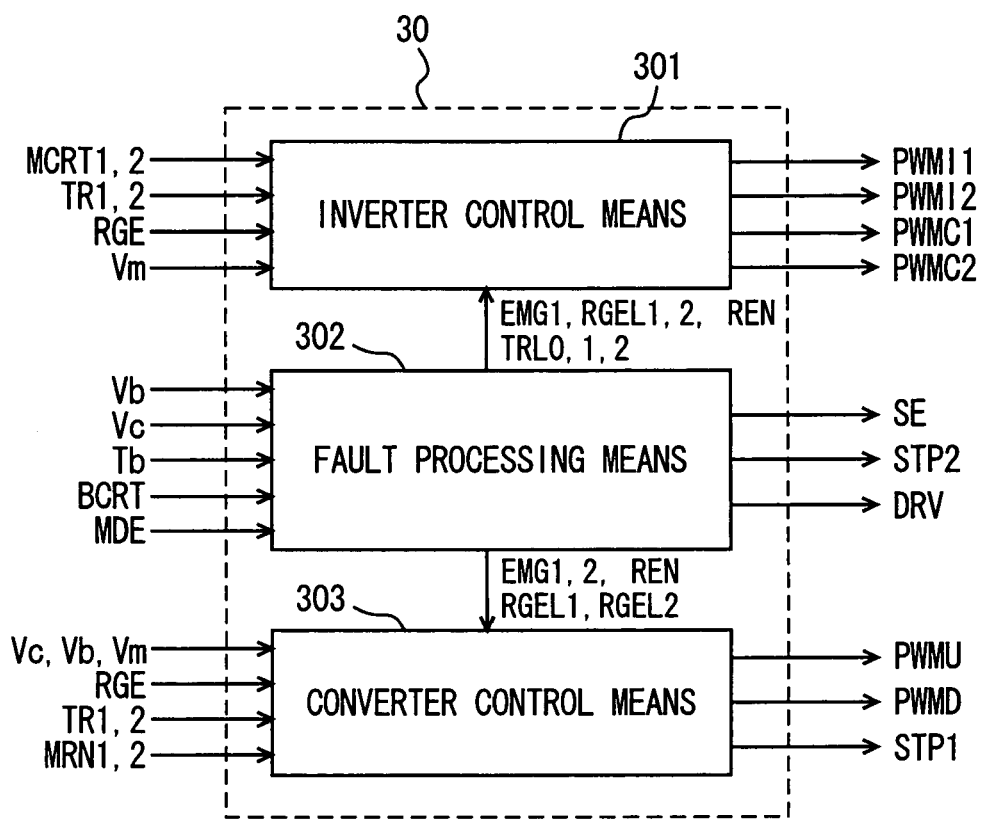
FIG. 2 is a functional block diagram of the control device shown in FIG. 1.

FIG. 2 is a functional block diagram of control device 30 shown in FIG. 1. Referring to FIG. 2, control device 30 includes inverter control means 301, fault processing means 302, and converter control means 303.

Inverter control means 301 generates signals PWMI1, PWMI2 for turning on/off NPN transistors Q3–Q8 of inverters 14, 31, respectively, in a manner as will be described later upon driving of AC motor M1 or M2, based on torque command values TR1, TR2, motor currents MCRT1, MCRT2, and output voltage Vm of voltage step-up converter 12, and outputs the generated signals PWMI1, PWMI2 to inverters 14, 31, respectively.

When receiving a signal EMG1 from fault processing means 302, inverter control means 301 generates and outputs signals PWMI1, PWMI2 to inverters 14, 31, respectively, based on torque command values TRL0–2 instead of torque command values TR1, TR2. Torque command value TRL0 is one for setting the output torque of AC motors M1 and M2 both to zero. Torque command value TRL1 is for driving AC motor M1 as a drive motor at the time when driving AC motors M1, M2 to cause a total sum of energy at AC motor M1 and energy at AC motor M2 to be the regenerative energy. Torque command value TRL2 is for driving AC motor M2 as a drive motor when driving AC motors M1, M2 to cause a total sum of energies at AC motors M1, M2 to be the regenerative energy.

When receiving a signal RGEL1 (or RGEL2) from fault processing means 302, inverter control means 301 generates and outputs signal PWMC1 (or PWMC2) to inverter 14 (or 31).

Further, in receipt of a signal REN from fault processing means 302, inverter control means 301 generates signals PWMI1, PWMI2 based on torque command values TR1, TR2 instead of torque command values TRL0–2, and outputs the generated signals PWMI1, PMWI2 to inverters 14, 31, respectively.

Further, in the regenerative braking mode of the hybrid vehicle, inverter control means 301 receives signal RGE from the external ECU, and, in response to the received signal RGE, generates signals PWMC1, PWMC2 for converting AC voltages generated by AC motors M1, M2 to DC voltages, and outputs the generated signals PWMC1, PWMC2 to inverters 14, 31, respectively.

Fault processing means 302 receives voltage Vb from voltage sensor 10A, voltage Vc from voltage sensor 11, temperature Tb from temperature sensor 10B, current BCRT from current sensor 18, and signal MDE form the external ECU. Fault processing means 302 determines whether there is a fault in DC power supply B based on voltage Vb or temperature Tb.

More specifically, fault processing means 302 compares voltage Vb with a reference value, and determines that there is the fault in DC power supply B when voltage Vb is lower than the reference value. Fault processing means 302 calculates internal resistance of DC power supply B based on voltage Vb and current BCRT. Fault processing means 302 compares the calculated internal resistance with a reference value, and determines that there is the fault in DC power supply B when the internal resistance is larger than the reference value. Further, fault processing means 302 compares temperature Tb with a reference value, and determines that there is the fault in DC power supply B when temperature Tb is higher than the reference value.

Fault processing means 302 determines whether DC power supply B suffers the fault or not based on either one of the above-described three ways. When there is the fault in DC power supply B, fault processing means 302 generates signals EMG1, STP2 and torque command value TRL0, and outputs the generated signal EMG1 and torque command value TRL0 to inverter control means 301, signal EMG1 to converter control means 303, and signal STP2 to DC/DC converter 20.

After outputting signals EMG1, STP2 and torque command value TRL0, fault processing means 302 generates and outputs signal SE of the L level to system relays SR1, SR2.

Further, after outputting signal SE of the L level to system relays SR1, SR2, fault processing means 302 determines whether voltage Vc from voltage sensor 11 is not greater than a lower limit of an operating voltage range of DC/DC converter 20. When voltage Vc is greater than the lower limit, fault processing means 302 generates signal EMG2 and signal DRV, and outputs the generated signals EMG2 and DRV to converter control means 303 and DC/DC converter 20, respectively. After outputting signal EMG2 and DRV, fault processing means 302 generates signal REN, and outputs the generated signal REN to inverter control means 301 and to converter control means 303.

When voltage Vc is not greater than the lower limit, fault processing means 302 detects the drive states of AC motors M1, M2 based on signal MDE from the external ECU, and generates torque command value TRL1 and signal RGEL2 (or torque command value TRL2 and signal RGEL1) for driving AC motors M1, M2 such that a total sum of energies at AC motors M1, M2 becomes the regenerative energy in accordance with the detected drive states. In this case, when AC motor M1 is in a driving mode and AC motor M2 is in a regenerative mode, fault processing means 302 generates torque command value TRL1 such that the amount of power consumed at AC motor M1 is smaller than the amount of power generated at AC motor M2. When AC motors M1, M2 are both in the driving mode, fault processing means 302 generates torque command value TRL2 and signal RGEL1 (or torque command value TRL1 and signal RGEL2) such that AC motor M1 (or M2) is driven in the regenerative mode, and AC motor M2 (or M1) is driven in the driving mode.

Fault processing means 302 outputs the generated torque command value TRL1 (or TRL2) and signal RGEL2 (or RGEL1) to inverter control means 301, and outputs the generated signal RGEL2 (or RGEL1) to converter control means 303.

Converter control means 303 generates signal PWMU for turning on/off NPN transistors Q1, Q2 of voltage step-up converter 12 in a manner as will be described later upon driving of AC motor M1 or M2, based on torque command values TR1, TR2 from the external ECU, voltage Vb output from DC power supply B, motor revolution numbers MRN1, MRN2, and output voltage Vm from voltage step-up converter 12, and outputs the generated signal PWMU to voltage step-up converter 12.

When receiving signal EMG1 from fault processing means 302, converter control means 303 generates and outputs signal STP1 to voltage step-up converter 12.

Further, converter control means 303 generates signal PWMD for down-converting DC voltage(s) from inverter 14 and/or inverter 31 in response to one of signals EMG2, RGEL1, RGEL2 from fault processing means 302 and signal RGE from the external ECU, and outputs the generated signal PWMD to voltage step-up converter 12.

As described above, voltage step-up converter 12 has a function as a bidirectional converter, since it can down-convert a voltage in accordance with signal PWMD for down-converting the DC voltage.

To generate signal PWMD, converter control means 303 calculates an inverter input voltage command Vdc_com_iv in response to signal RGE, and calculates a duty ratio for turning on/off NPN transistors Q1, Q2 based on the calculated inverter input voltage command Vdc_com_iv and voltage Vb (also referred to as "battery voltage Vb") (this is called "calculation method 1"). Further, converter control means 303 calculates a battery side voltage command Vdc_com_by in response to one of signals EMG2, RGEL1 and RGEL2, and calculates a duty ratio for turning on/off NPN transistors Q1, Q2 based on the calculated battery side voltage command Vdc_com_by and inverter input voltage Vm (=output voltage Vm) (this is called "calculation method 2").

When receiving signal EMG1 from fault processing means 302, converter control means 303 calculates a duty ratio by calculation method 2 in response to one of signals EMG2, RGEL1 and RGEL2. Further, in receipt of signal REN from fault processing means 302, converter control means 303 calculates a duty ratio by calculation method 1 in response to signal RGE.

Figure 3:
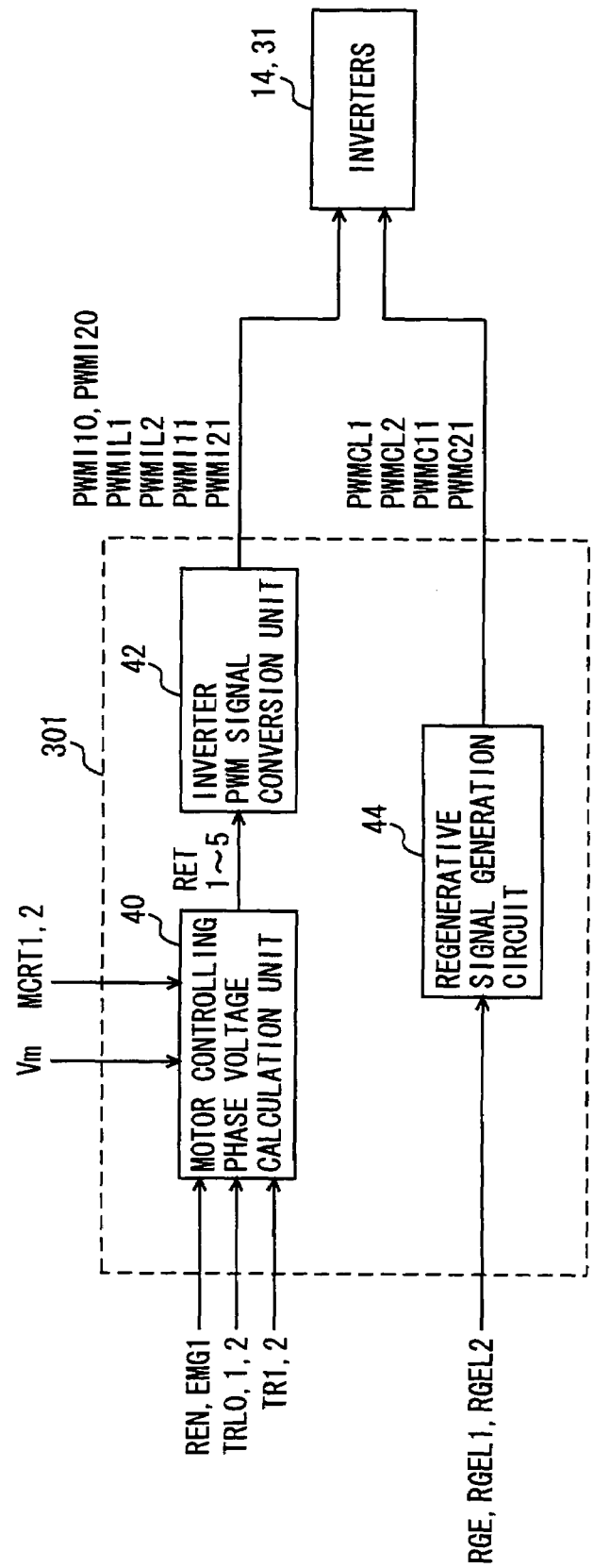
FIG. 3 is a functional block diagram of the inverter control means shown in FIG. 2.

FIG. 3 is a functional block diagram of inverter control means 301. Referring to FIG. 3, inverter control means 301 includes a motor controlling phase voltage calculation unit 40, an inverter PWM signal conversion unit 42, and a regenerative signal generation circuit 44.

Motor controlling phase voltage calculation unit 40 receives output voltage Vm of voltage step-up converter 12, i.e., the input voltage to inverters 14, 31, from voltage sensor 13, receives motor currents MCRT1, MCRT2 flowing through each phase of AC motors M1, M2, from voltage sensors 24, 28, respectively, receives torque command values TR1, TR2 from the external ECU, and receives signal EMG1 and torque command values TRL0–TRL2 from fault processing means 302. Motor controlling phase voltage calculation unit 40 calculates a voltage to be applied to the coils of respective phases of AC motors M1, M2 based on torque command values TR1, TR2 (or TRL0–TRL2), motor currents MCRT1, MCRT2 and output voltage Vm, and supplies the calculated result to inverter PWM signal conversion unit 42.

In this case, when receiving signal EMG1 from fault processing means 302, motor controlling phase voltage calculation unit 40 calculates the voltage to be applied to the coils of respective phases of AC motors M1, M2 using torque command values TRL0–TRL2.

In other words, once receiving signal EMG1, motor controlling phase voltage calculation unit 40 refrains from using torque command values TR1, TR2 for calculating the voltage to be applied to the coils of respective phases of AC motors M1, M2, even if it receives torque command values TR1, TR2 from the external ECU before receiving torque command values TRL0–TRL2 from fault processing means 302. It calculates, only after receiving torque command values TRL0–TRL2, the voltage to be applied to the coils of respective phases of AC motors M1, M2 using the received torque command values TRL0–TRL2.

When receiving signal REN from fault processing means 302, motor controlling phase voltage calculation unit 40 calculates the voltage to be applied to the coils of respective phases AC motors M1, M2 using torque command values TR1, TR2 instead of torque command values TRL0–TRL2.

Motor controlling phase voltage calculation unit 40 generates a calculation result RET1 based on torque command value TRL0, and outputs the result to inverter PWM signal conversion unit 42. Motor controlling phase voltage calculation unit 40 generates a calculation result RET2 based on torque command value TRL1, and outputs it to inverter PWM signal conversion unit 42. Further, motor controlling phase voltage calculation unit 40 generates a calculation result RET3 based on torque command value TRL2, and outputs the result to inverter PWM signal conversion unit 42. Motor controlling phase voltage calculation unit 40 generates a calculation result RET4 based on torque command value TR1, and outputs the result to inverter PWM signal conversion unit 42. Still further, motor controlling phase voltage calculation unit 40 generates a calculation result RET5 based on torque command value TR2, and outputs it to inverter PWM signal conversion unit 42.

Inverter PWM signal conversion unit 42 generates signals PWMI1, PWMI2 for turning on/off NPN transistors Q3–Q8 of inverters 14, 31 in effect, based on the calculation result received from motor controlling phase voltage calculation unit 40, and outputs the generated signals PWMI1, PWMI2 to NPN transistors Q3–Q8 of inverters 14, 31, respectively.

In this case, inverter PWM signal conversion unit 42 generates signal PWMI 10 (a kind of signal PWMI 1) and signal PWMI20 (a kind of signal PWM12) in response to calculation result RET 1 from motor controlling phase voltage calculation unit 40, and outputs the generated signals PWMI 10 and PWMI20 to inverters 14 and 31, respectively.

Inverter PWM signal conversion unit 42 generates signal PWMIL1 (a kind of PWMI1) in response to calculation result RET2 from motor controlling phase voltage calculation unit 40, and outputs the generated signal PWMIL1 to inverter 14.

Further, inverter PWM signal conversion unit 42 generates signal PWMIL2 (a kind of signal PWMI2) in response to calculation result RET3 from motor controlling phase voltage calculation unit 40, and outputs the generated signal PWMIL2 to inverter 31.

Inverter PWM signal conversion unit 42 generates signal PWMIL1 (a kind of signal PWMI1) in response to calculation result RET4 from motor controlling phase voltage calculation unit 40, and outputs the generated signal PWMI11 to inverter 14.

Further, inverter PWM signal conversion unit 42 generates signal PWMI21 (a kind of signal PWMI2) in response to calculation result RET5 from motor controlling phase voltage calculation unit 40, and outputs the generated signal PWMI21 to inverter 31.

Accordingly, NPN transistors Q3–Q8 of inverters 14, 31 undergo switching control, for control of a current to be flown through each phase of AC motors M1, M2 such that AC motors M1, M2 output the designated torque. With the motor drive current thus controlled, motor torque in accordance with torque command values TR1, TR2, TRL0–2 is output.

Regenerative signal generation circuit 44 generates signal PWMC1 or PWMC2 in response to signal RGE from the external ECU, and outputs the generated signal to inverter 14 or 31. Regenerative signal generation circuit 44 generates signal PWMCL1 or PWMCL2 in response to signal RGEL1 or RGEL2 from fault processing means 302, and outputs the generated signal to inverter 14 or 31.

In this case, regenerative signal generation circuit 44 generates signal PWMC11 or PWMC21 (kinds of signals PWMC1, PWMC2, respectively) in response to signal RGE, and outputs the generated signal to inverter 14 or 31.

Figure 4:
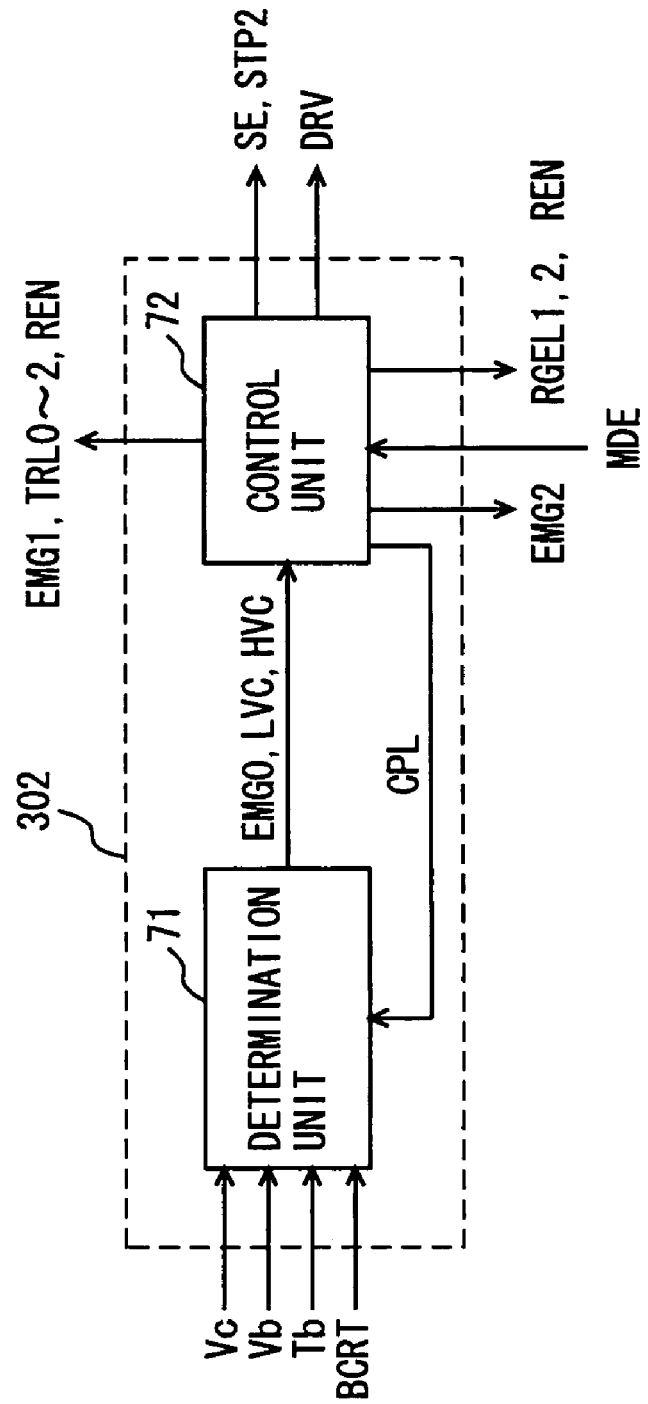
FIG. 4 is a functional block diagram of the fault processing means shown in FIG. 2.

FIG. 4 is a functional block diagram of fault processing means 302 shown in FIG. 2. Referring to FIG. 4, fault processing means 302 includes a determination unit 71 and a control unit 72. Determination unit 71 receives voltage Vb from voltage sensor 10A, voltage Vc from voltage sensor 11, temperature Tb from temperature sensor 10B, current BCRT from current sensor 18, and a signal CPL from control unit 72.

Determination unit 71 determines whether there is the fault in DC power supply B based on voltage Vb or temperature Tb. More specifically, determination unit 71 compares voltage Vb with the reference value, and determines that there is the fault in DC power supply B when voltage Vb is lower than the reference value. Determination unit 71 calculates internal resistance of DC power supply B based on voltage Vb and current BCRT. Determination unit 71 compares the calculated internal resistance with the reference value, and determines that DC power supply B suffers the fault when the internal resistance is greater than the reference value. Further, determination unit 71 compares temperature Tb with the reference value, and determines that there is the fault in DC power supply B when temperature Tb is higher than the reference value.

Determination unit 71 determines whether there is the fault in DC power supply B by one of the three ways described above. When determining that there is the fault in DC power supply B, determination unit 71 generates and outputs signal EMG0 to control unit 72.

When receiving signal CPL from control unit 72, determination unit 71 determines whether voltage Vc is not greater than the lower limit of the operating voltage range of DC/DC converter 20, and generates and outputs signal LVC to control unit 72 when voltage Vc is not greater than the lower limit, and generates and outputs signal HVC to control unit 72 when voltage Vc is greater than the lower limit.

Control unit 72, in receipt of signal EMG0 from determination unit 71, generates torque command value TRL0, signal STP2 and signal EMG1. Control unit 72 outputs the generated signal EMG1 and torque command value TRL0 to inverter control means 301, the generated signal EMG1 to converter control means 303, and the generated signal STP2 to DC/DC converter 20. Upon completion of the output of signals EMG1, STP2 and torque command value TRL0, control unit 72 generates and outputs signal SE of the L level to system relays SR1, SR2, to cut off system relays SR1, SR2. Thereafter, control unit 72 generates and outputs to determination unit 71 signal CPL indicating that signal SE of the L level has been output.

In receipt of signal LVC from determination unit 71, control unit 72 detects the drive states of AC motors M1, M2 based on signal MDE from the external ECU. Control unit 72 generates torque command value TRL1 and signal RGEL2 (or torque command value TRL2 and signal REGL1) to cause a total sum of energies in AC motors M1, M2 to be the regenerative energy in accordance with the detected drive states, and outputs the generated torque command value TRL1 (or TRL2) to inverter control means 301, and signal RGEL2 (or RGEL1) to inverter control means 301 and to converter control means 303.

Further, in receipt of signal HVC from determination unit 71, control unit 72 generates and outputs signals EMG2 and DRV to converter control means 303 and DC/DC converter 20, respectively.

Upon completion of output of signals EMG2 and DRV, control unit 72 generates and outputs signal REN to inverter control means 301 and to converter control means 303.

Figure 5:
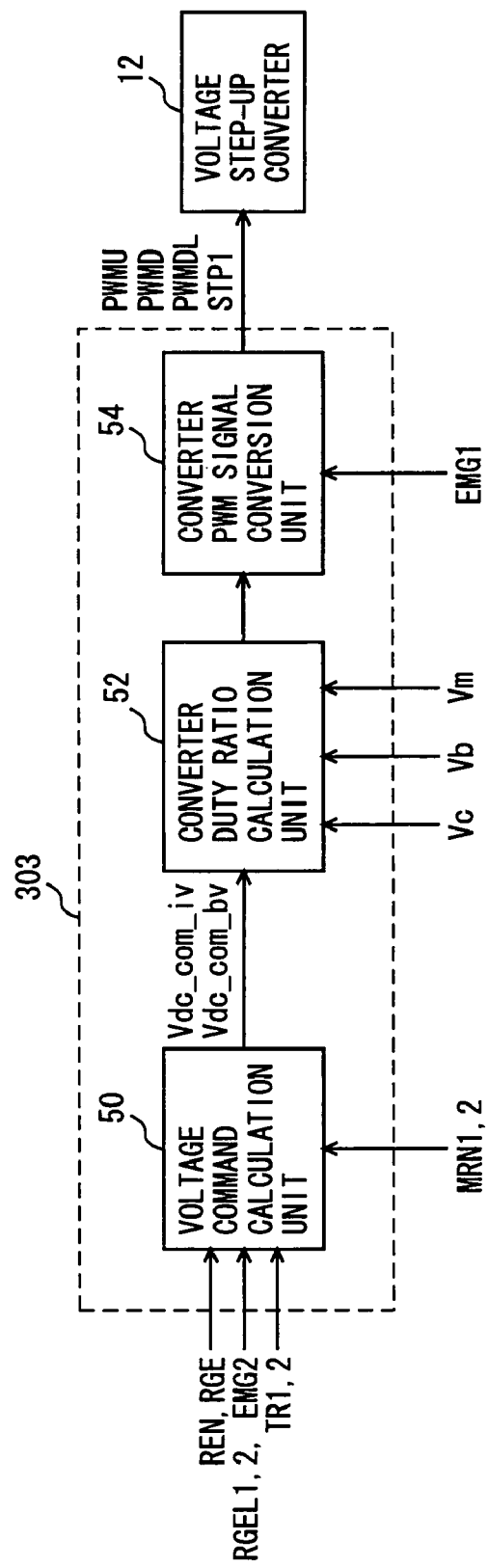
FIG. 5 is a functional block diagram of the converter control means shown in FIG. 2.

FIG. 5 is a functional block diagram of converter control means 303 shown in FIG. 2. Referring to FIG. 5, converter control means 303 includes a voltage command calculation unit 50, a converter duty ratio calculation unit 52, and a converter PWM signal conversion unit 54.

Voltage command calculation unit 50 calculates an optimum value (target value) of inverter input voltage Vm, i.e., a voltage command Vdc_com_iv, based on torque command values TR1, TR2 and motor revolution numbers MRN1, MRN2 received from the external ECU, and outputs the calculated voltage command Vdc_com_iv to converter duty ratio calculation unit 52.

Voltage command calculation unit 50, in response to signal RGE from the external ECU, outputs voltage command Vdc_com_iv calculated before receiving signal RGE, to converter duty ratio calculation unit 52.

Further, voltage command calculation unit 50, in response to one of signals RGEL1, RGEL2 and EMG2 from fault processing means 302, calculates a battery side voltage command Vdc_com_by being a target value of the primary voltage of voltage step-up converter 12, and outputs the calculated battery side voltage command Vdc_com_by to converter duty ratio calculation unit 52.

When voltage command calculation unit 50 receives signal REN from fault processing means 30 after calculating battery side voltage command Vdc_com_by in response to signals RGEL1, RGEL2 or EMG2, it calculates voltage command Vdc_com_iv based on torque command values TR1, TR2 and motor revolution numbers MRN1, MRN2.

Converter duty ratio calculation unit 52 receives voltage Vb from voltage sensor 10A, voltage Vc from voltage sensor 11, voltage command Vdc_com_iv or Vdc_com_by from voltage command calculation unit 50, and output voltage Vm from voltage sensor 13. When receiving voltage command Vdc_com_iv from voltage command calculation unit 50, converter duty ratio calculation unit 52 calculates a duty ratio for setting inverter input voltage Vm to voltage command Vdc_com_iv output from voltage command calculation unit 50, based on battery voltage Vb, and outputs the calculated duty ratio to converter PWM signal conversion unit 54.

Further, when receiving voltage command Vdc_com_by from voltage command calculation unit 50, converter duty ratio calculation unit 52 calculates a duty ratio for setting voltage Vc as a primary voltage of voltage step-up converter 12 to voltage command Vdc_com_bv output from voltage command calculation unit 50, based on inverter input voltage Vm, and outputs the calculated duty ratio to converter PWM signal conversion unit 54.

In this case, converter duty ratio calculation unit 52 generates and outputs duty ratio DRU or DRD to converter PWM signal conversion unit 54 when it receives voltage command Vdc_com_iv. When receiving voltage command Vdc_com_by, converter duty ratio calculation unit 52 generates and outputs duty ratio DRDD to converter PWM signal conversion unit 54.

Converter PWM signal conversion unit 54 generates signal PWMU for turning on/off NPN transistors Q1, Q2 of voltage step-up converter 12 based on duty ratio DRU from converter duty ratio calculation unit 52, and outputs the generated signal PWMU to voltage step-up converter 12.

Converter PWM signal conversion unit 54 generates signal PWMD for turning on/off NPN transistors Q1, Q2 of voltage step-up converter 12 based on duty ratio DRD from converter duty ratio calculation unit 52, and outputs the generated signal PWMD to voltage step-up converter 12.

Further, converter PWM signal conversion unit 54 generates signal PWMDL for turning on/off NPN transistors Q1, Q2 of voltage step-up converter 12 based on duty ratio DRDD from converter duty ratio calculation unit 52, and outputs the generated signal PWMDL to voltage step-up converter 12.

In receipt of signal EMG1 from fault processing means 302, converter PWM signal conversion unit 54 generates signal STP1 for stopping the switching operation of voltage step-up converter 12, regardless of duty ratios DRU, DRD, DRDD from converter duty ratio calculation unit 52, and outputs the generated signal STP1 to voltage step-up converter 12.

When on-duty of NPN transistor Q2 on the lower side of voltage step-up converter 12 is increased, the electric power accumulated in reactor L1 increases, and an output of higher voltage can be obtained. When on-duty of NPN transistor Q1 on the upper side is increased, the voltage on the power supply line decreases. Thus, controlling the duty ratio of NPN transistors Q1, Q2 can control the voltage on the power supply line to an arbitrary voltage equal to or greater than the output voltage of DC power supply B.

As described above, in the present invention, upon detection of the fault in DC power supply B, the output torque of AC motors M1 and M2 are set to zero, to drive AC motors M1, M2 such that a total sum of energies at AC motors M1, M2 becomes zero. In the case where voltage Vc is not greater than the lower limit of the operating voltage range of DC/DC converter 20 when system relays SR1, SR2 are cut off, a total sum of energies at AC motors M1, M2 is set to the regenerative energy, and control of voltage step-up converter 12 is switched to voltage step-down control after voltage Vc becomes greater than the lower limit.

Table 1 shows relations between torque command values TR1, TR2 of AC motors M1, M2 and control signals of voltage step-up converter 12 and inverters 14, 31, in the case of setting the output torque of AC motors M1, M2 to zero and in the case of setting voltage Vc higher than the lower limit.

TABLE 1

| Torque command value TR1 of AC motor M1 | Torque command value TR2 of AC motor M2 | Signal PWMD | Signal PWMI1 | Signal PWMI2 | Signal PWMC1 | Signal PWMC2 |
|---|---|---|---|---|---|---|
| TRL0 | TRL0 | — | PWMI10 | PWMI20 | — | — |
| TRL1 | RGEL2 | PWMDL1 | PWMIL1 | — | — | PWMCL2 |
| RGEL1 | TRL2 | PWMDL2 | — | PWMIL2 | PWMCL1 | — |

Specifically, in the case of setting the output torque of AC motors M1 and M2 to zero, torque command values TR1, TR2 of AC motors M1, M2 are set to torque command value TRL0, and signals PWMI10 and PWMI20 are output to inverters 14 and 31, respectively. Inverter 14 drives AC motor M1 such that the output torque becomes zero in response to signal PWMI10, and inverter 31 drives AC motor M2 such that the output torque becomes zero in response to signal PWMI20.

In the case of setting voltage Vc greater than the lower limit, AC motors M1, M2 are driven in the driving mode and the regenerative mode, respectively, or AC motors M1, M2 are driven in the regenerative mode and the driving mode, respectively.

When driving AC motors M1, M2 in the driving mode and the regenerative mode, respectively, torque command value TR1 of AC motor M1 is set to torque command value TRL1, and torque command value TR2 of AC motor M2 is set to regenerative torque (signal RGEL2). Signal PWMDL1 (a kind of signal PWMDL) is output to voltage step-up converter 12, signal PWMIL1 to inverter 14, and signal PWMCL2 to inverter 31.

Then, inverter 31 drives AC motor M2 in the regenerative mode in response to signal PWMCL2, converts the AC voltage generated by AC motor M2 to the DC voltage, and supplies the DC voltage to voltage step-up converter 12 and to inverter 14. Inverter 14, in response to signal PWMIL1, converts the DC voltage supplied from inverter 31 to the AC voltage to drive AC motor M1 in the driving mode. Voltage step-up converter 12, in response to signal PWMDL1, down-converts the DC voltage supplied from inverter 31 such that voltage Vc corresponds to voltage command Vdc_com_bvl (a kind of voltage command Vdc_com_by), and supplies the same to DC/DC converter 20.

To drive AC motors M1, M2 in the regenerative mode and the driving mode, respectively, torque command value TR1 of AC motor M1 is set to regenerative torque (signal RGEL1), and torque command value TR2 of AC motor M2 is set to torque command value TRL2. Signal PWMDL2 (a kind of signal PWMDL) is output to voltage step-up converter 12, signal PWMCL1 to inverter 14, and signal PWMIL2 to inverter 31.

Then, inverter 14 drives AC motor M1 in the regenerative mode in response to signal PWMCL1, converts the AC voltage generated by AC motor M1 to the DC voltage, and supplies the DC voltage to voltage step-up converter 12 and to inverter 31. Inverter 31, in response to signal PWMIL2, converts the DC voltage supplied from inverter 14 to the AC voltage to drive AC motor M2 in the driving mode. Voltage step-up converter 12, in response to signal PWMDL2, down-converts the DC voltage supplied from inverter 14 such that voltage Vc corresponds to voltage command Vdc_com_bvl, and supplies the same to DC/DC converter 20.

Although Table 1 shows the case where one of AC motors M1, M2 is driven in the driving mode and the other in the regenerative mode, both of AC motors M1, M2 may be driven in the regenerative mode to set voltage Vc greater than the lower limit of the operating voltage range of DC/DC converter 20.

Figure 6:
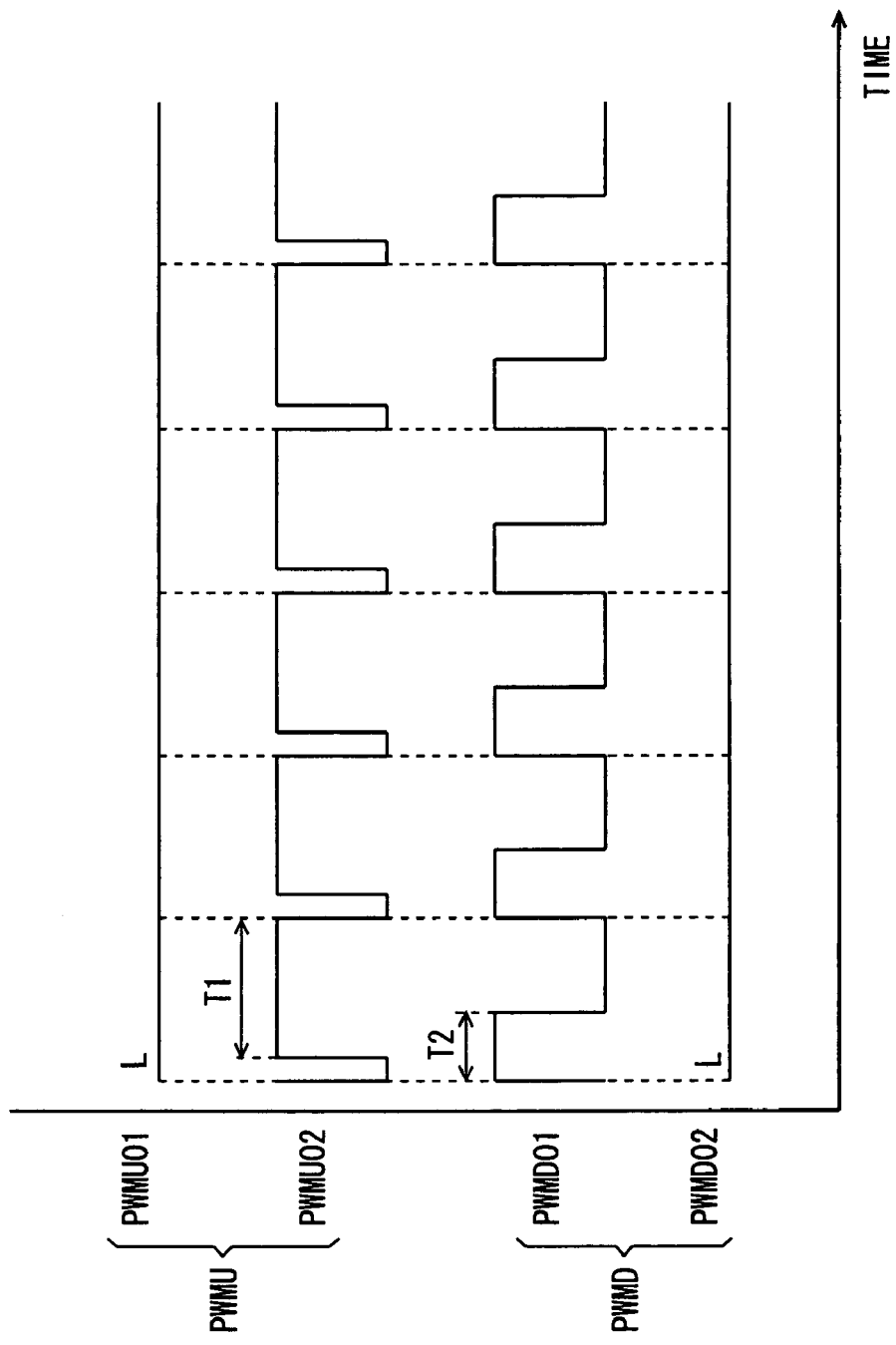
FIG. 6 is a timing chart of signals generated by the converter control means shown in FIG. 2.

FIG. 6 is a timing chart of signals PWMU and PWMD generated by converter control means 303. Referring to FIG. 6, signal PWMU is comprised of signals PWMU01 and PWMU02. Signal PWMD (including signal PWMDL) is comprised of signals PWMD01 and PWMD02. Signals PWMU01, PWMD01 are output to NPN transistor Q1, and signals PWMU02, PWMD02 are output to NPN transistor Q2.

When voltage step-up converter 12 boosts the DC voltage from DC power supply B, NPN transistor Q1 is always off, and thus, signal PWMU01 is a signal of the L level. When voltage step-up converter 12 boosts the DC voltage from DC power supply B, NPN transistor Q2 is turned on/off with a prescribed duty ratio DRU, and thus, signal PWMU02 is a signal that periodically changes between the L level and the H level.

A time period T1 during which it is in the H level is determined in accordance with a voltage step-up ratio (=Vdc_com_iv/Vb). When the on period of NPN transistor Q2 is long, the electric power accumulated in reactor L1, and hence, voltage Vm increases. When the on period of NPN transistor Q2 is short, the electric power accumulated in reactor L1 becomes less, and voltage Vm decreases to approach voltage command Vdc_com_iv.

When voltage step-up converter 12 down-converts the DC voltage from inverter 14 (or 31), NPN transistor Q2 is always off. Thus, signal PWMD02 is a signal of the L level. When voltage step-up converter 12 down-converts the DC voltage from inverter 14 (or 31), NPN transistor Q1 is turned on/off with prescribed duty ratios DRD, DRDD, and thus, signal PWMD01 is a signal that periodically changes between the L level and the H level.

A time period T2 corresponding to its H level is determined according to a voltage step-down ratio (=Vdc_com_bv/Vm). When the on period of NPN transistor Q1 is long, the current flowing from the side of inverters 14, 31 through NPN transistor Q1 to the side of DC power supply B increases, and thus, voltage Vc increases. When the on period of NPN transistor Q1 is short, the current flowing from the inverters 14, 31 side via NPN transistor Q1 to the DC power supply B side decreases, and thus, voltage Vc decreases to approach voltage Vb or voltage command Vdc_com_bv.

When voltage step-up converter 12 boosts the DC voltage from DC power supply B, NPN transistor Q1 is constantly off due to signal PWMU, and NPN transistor Q2 is turned on/off with a prescribed duty ratio by signal PWMU. When inverter input voltage Vm becomes greater than voltage command Vdc_com_iv, converter duty ratio calculation unit 52 calculates duty ratio DRD for causing shift of energy from the inverters 14, 31 side to the DC power supply B side, and outputs the same to converter PWM signal conversion unit 54. Converter PWM signal conversion unit 54 generates and outputs to voltage step-up converter 12 signal PWMD in accordance with duty ratio DRD from converter duty ratio calculation unit 52. Accordingly, energy is shifted from the side of inverters 14, 31 to the side of DC power supply B, and the voltage level of inverter input voltage Vm decreases.

Thereafter, when inverter input voltage Vm becomes lower than voltage command Vdc_corn iv, converter duty ratio calculation unit 52 calculates duty ratio DRU for causing energy to shift from the side of DC power supply B to the side of inverters 14, 31, and outputs the same to converter PWM signal conversion unit 54. Converter PWM signal conversion unit 54 generates and outputs to voltage step-up converter 12 signal PWMU in accordance with duty ratio DRU from converter duty ratio calculation unit 52. Accordingly, the energy is shifted from the DC power supply B side to the inverters 14, 31 side, and the voltage level of inverter input voltage Vm increases.

As described above, with voltage step-up converter 12 controlled to perform the voltage step-up and step-down operations, inverter input voltage Vm is controlled to match voltage command Vdc_com_iv.

When voltage step-up converter 12 down-converts the DC voltage from inverters 14, 31, NPN transistor Q2 is always off, and NPN transistor Q1 is turned on/off at the prescribed duty ratio by signal PWMD or PWMDL. When voltage Vc, i.e., the primary voltage of voltage step-up converter 12, becomes lower than voltage command Vdc_com_by, converter duty ratio calculation unit 52 calculates a duty ratio with an on-duty (time period T2) of NPN transistor Q1 elongated, and outputs the calculated duty ratio to converter PWM signal conversion unit 54. Accordingly, the current flowing from the side of inverters 14, 31 to the side of DC power supply B increases, and thus, voltage Vc increases.

When voltage Vc becomes greater than voltage command Vdc_com_by, converter duty ratio calculation unit 52 calculates a duty ratio with the on-duty (time period T2) of NPN transistor Q1 shortened, and outputs the calculated duty ratio to converter PWM signal conversion unit 54. Accordingly, the current flowing from the inverters 14, 31 side to the DC power supply B side decreases, and thus, voltage Vc decreases.

As described above, with voltage step-up converter 12 controlled to adjust the current flowing from the inverters 14, 31 side to the DC power supply B side, control voltage Vc is controlled to match voltage command Vdc_com_bv.

Figure 7:
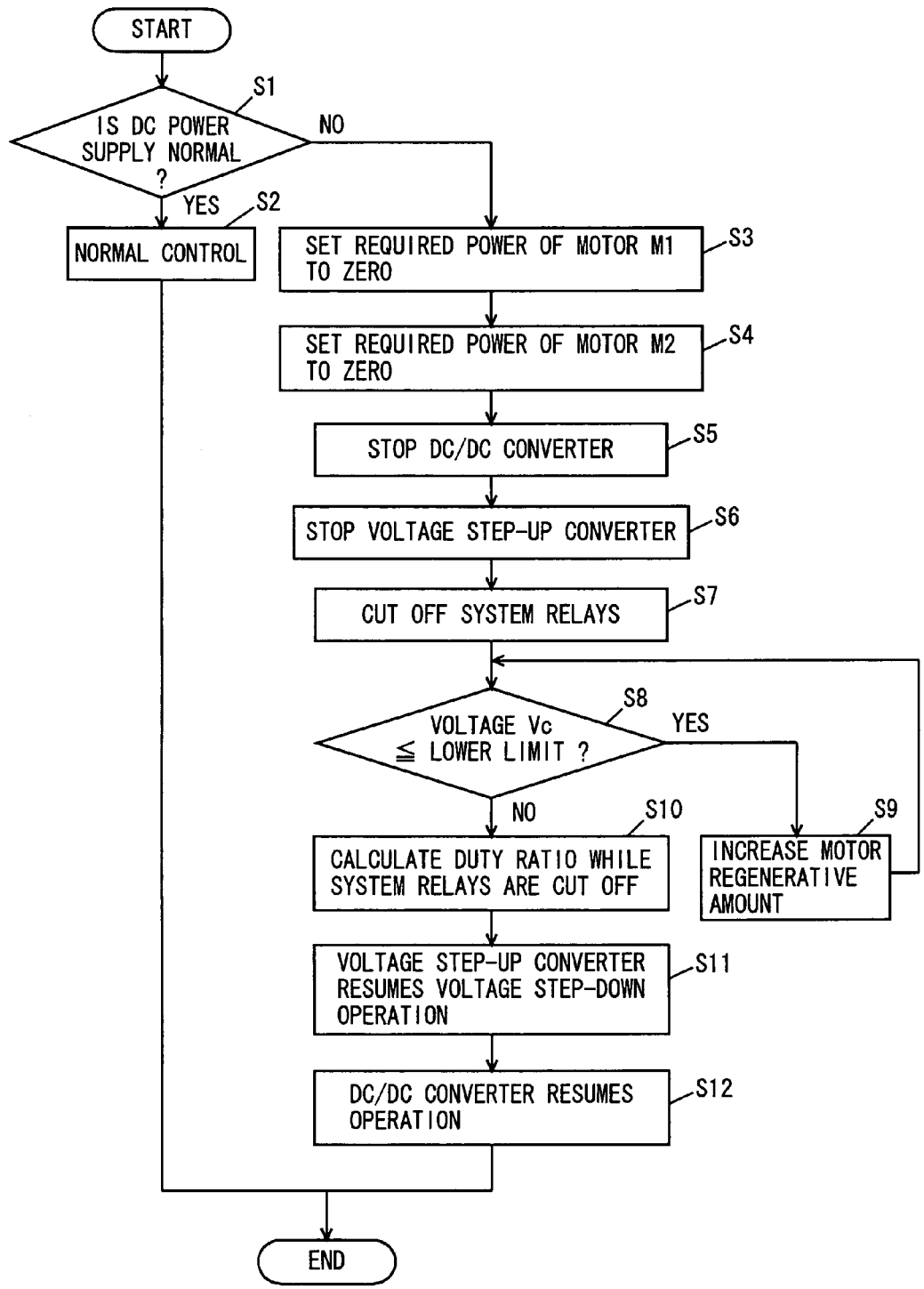
FIG. 7 is a flowchart illustrating an operation of the hybrid vehicle drive apparatus in the event in a fault in a DC power supply.

FIG. 7 is a flowchart illustrating an operation in hybrid vehicle drive apparatus 100 in the event of the fault in DC power supply B. The flowchart of FIG. 7 is carried out at regular intervals. Referring to FIG. 7, at the start of a series of operations, fault processing means 302 determines whether DC power supply B is normal or not in the above-described manner, based on voltage Vb or temperature Tb (step S1). When it is determined that DC power supply B is normal, normal control is carried out (step S2).

If it is determined that DC power supply B is not normal in step S1, fault processing means 302 generates signals EMG1, STP2 and torque command value TRL0, and outputs signal EMG1 and torque command value TRL0 to inverter control means 301, signal EMG1 to converter control means 303, and signal STP2 to DC/DC converter 20.

That DC power supply B is determined to be abnormal in step S1 corresponds to detection of the fault in DC power supply B.

Motor controlling phase voltage calculation unit 40 of inverter control means 301, in response to signal EMG1 from fault processing means 302, calculates a voltage to be applied to each phase of AC motors M1, M2 to cause zero output torque of AC motors M1, M2, based on torque command value TRL0 from fault processing means 302 instead of torque command values TR1, TR2, and outputs calculation result RET1 to inverter PWM signal conversion unit 42. Inverter PWM signal conversion unit 42 generates signals PWMI10 and PWMI20 based on calculation result RET 1 from motor controlling phase voltage calculation unit 40, and outputs the generated signals PWMI10 and PWMI20 to inverters 14 and 31, respectively.

Inverter 14 drives AC motor M1 to cause the output torque to be zero, based on signal PWMI10 from inverter control means 301 (step S3). Inverter 31 drives AC motor M2 to cause zero output torque, based on signal PWMI20 from inverter control means 301 (step S4). Accordingly, the total sum of energy at AC motor M1 and energy at AC motor M2 becomes zero. DC/DC converter 20 is stopped by signal STP2 from fault processing means 302 (step S5).

Converter PWM signal conversion unit 54 of converter control means 303 generates signal STP1 in response to signal EMG1 from fault processing means 302, and outputs the same to voltage step-up converter 12. As such, the switching operation of voltage step-up converter 12 is stopped (step S6).

Fault processing means 302 then generates and outputs signal SE of the L level to system relays SR1, SR2, so that system relays SR1, SR2 are cut off (step S7).

As such, system relays SR1, SR2 are cut off (see step S7) only after the conditions that the total sum of energies at AC motors M1 and M2 becomes zero (see steps S3 and S4), that DC/DC converter 20 is stopped (see step S5) and that voltage step-up converter 12 is stopped (see step S6) are all satisfied.

The timing to cut off system relays SR1, SR2 is determined as described above for the following reasons. When the total sum of energies at AC motors M1 and M2 is not zero, a DC current is flowing from the DC power supply B side to the inverters 14, 31 side, or from the inverters 14, 31 side to the DC power supply B side. In this case, either NPN transistor Q1 or Q2 in voltage step-up converter 12 is turned on/off.

During the switching operation of voltage step-up converter 12, a ripple current flows in synchronization with the switching operation of the current between DC power supply B and voltage step-up converter 12. Thus, if system relays SR1, SR2 are cut off during the energized state, there will occur electric arc of high temperature at the contact point, resulting in meltdown and adhesion or degradation of the contact point. When DC/DC converter 20 is in operation, the DC current from DC power supply B is also supplied to DC/DC converter 20, causing the tendency more significant.

For these reasons, system relays SR1, SR2 are cut off in the state where there is no DC current flowing between DC power supply B and voltage step-up converter 12.

After step S7, fault processing means 302 determines whether voltage Vc from voltage sensor 111 is not greater than the lower limit of the operating voltage range of DC/DC converter 20 (step S8). If voltage Vc is not greater than the lower limit, fault processing means 302 detects the drive states of AC motors M1, M2 based on signal MDE from the external ECU, and calculates torque command value TRL1 (or TRL2) to cause a total sum of energies at AC motors M1 and M2 to be the regenerative energy in accordance with the detected drive states, and then generates signal RGEL2 (or RGEL1). Thereafter, fault processing means 302 outputs torque command value TRL1 (or TRL2) to inverter control means 301, and outputs signal RGEL2 (or RGEL1) to inverter control means 301 and to converter control means 303.

Motor controlling phase voltage calculation unit 40 of inverter control means 301 calculates a voltage to be applied to each phase of AC motor M1 (or M2) to cause AC motor M1 (or M2) to output the torque designated by torque command value TRL1 (or TRL2), based on torque command value TRL1 (or TRL2) from fault processing means 302, motor current MCRT1 (or MCRT2) from current sensor 24 (or 28) and voltage Vm from voltage sensor 13. Motor controlling phase voltage calculation unit 40 outputs calculation result RET2 (or RET3) to inverter PWM signal conversion unit 42.

Inverter PWM signal conversion unit 42 generates signal PWM11 (or PWMIL2) based on calculation result RET2 (or RET3) from motor controlling phase voltage calculation unit 40, and outputs the same to inverter 14 (or 31). Inverter 14 (or 31), based on signal PWMIL1 (or PWMIL2), drives AC motor M1 (or M2) to output torque command value TRL1 (or TRL2).

Regenerative signal generation circuit 44 generates signal PWMCL2 (or PWMCL1) based on signal RGEL2 (or RGEL1) from fault processing means 302, and outputs the generated signal to inverter 31 (or 14).

Then, inverter 31 (or 14) converts the AC voltage generated by AC motor M2 (or M1) to the DC voltage based on signal PWMCL2 (or PWMCL 1), and supplies the DC voltage to capacitor C2.

Accordingly, AC motor M1 (or M2) operates as a drive motor, and AC motor M2 (or M1) operates as an electric power generator. Part of the electric power generated by AC motor M2 (or M1) is used to drive AC motor M1 (or M2), and the remaining power is supplied to voltage step-up converter 12.

Meanwhile, voltage command calculation unit 50 of converter control means 303 calculates voltage command Vdc_com_by for setting voltage Vc within the operating voltage range of DC/DC converter 20, in response to signal RGEL2 (or RGEL1) from fault processing means 302, and outputs the calculated voltage command Vdc_com_bvl to converter duty ratio calculation unit 52. Converter duty ratio calculation unit 52 calculates duty ratio DRDDI (a kind of duty ratio DRDD) based on voltage command Vdc_com_bvl from voltage command calculating unit 50 and voltage Vm from voltage sensor 13, and outputs the same to converter PWM signal conversion unit 54. Converter PWM signal conversion unit 54 generates signal PWMDLI (a kind of signal PWMDL) based on duty ratio DRDD 1 from converter duty ratio calculation unit 52, and outputs the same to voltage step-up converter 12. Voltage step-up converter 12, in response to signal PWMDL1, down-converts the DC voltage supplied from inverter 31 (or 14) and supplies the resulting voltage to DC/DC converter 20, to increase the motor regenerative amount (step S9). As a result, voltage Vc becomes higher than the lower limit.

After step S9, process goes to step S8, which is carried out again. That is, steps S8 and S9 are performed repeatedly until it is determined that voltage Vc is greater than the lower limit in step S8.

When it is determined that Voltage Vc is greater than the lower limit in step S8, fault processing means 302 generates and outputs signal EMG2 to converter control means 303. Voltage command calculation unit 50 of converter control means 303, in response to signal EMG2 from fault processing means 302, calculates voltage command Vdc_com_vb2 (a kind of Vdc_com_vb) falling within the operating voltage range of DC/DC converter 20, and outputs the calculated voltage command Vdc_com_vb2 to converter duty ratio calculation unit 52. Converter duty ratio calculation unit 52 calculates duty ratio DRDD2 (=Vdc_com_vb2/Vm) based on voltage command Vdc_com vb2 from voltage command calculation unit 50 and inverter input voltage Vm, and outputs the calculated duty ratio DRDD2 to converter PWM signal conversion unit 54 (step S10).

Converter PWM signal conversion unit 54 generates signal PWMDL2 (a kind of signal PWMDL) based on duty ratio DRDD2 from converter duty ratio calculation unit 52, and outputs the generated signal to voltage step-up converter 12.

Voltage step-up converter 12, in response to signal PWMDL2, down-converts the DC voltage supplied from inverters 14, 31 and supplies the resulting voltage to DC/DC converter 20, resuming the voltage step-down operation (step S11). Fault processing means 302 generates and outputs signal DRV to DC/DC converter 20, and DC/DC converter 20 resumes the operation in response to signal DRV (step S12).

The series of operations is finished after step S2 or S12.

It has been explained in conjunction with the flowchart of FIG. 7 that the output torque of AC motors M1 and M2 are set to zero in the event of the fault in DC power supply B, so as to control AC motors M1, M2 to cause the total sum of energies in AC motors M1 and M2 to be zero (see steps S3, S4). The present invention however is not limited thereto. AC motors M1, M2 may be controlled such that one of AC motors M1, M2 is driven by the electric power generated by the other. That is, all that is needed is that AC motors M1, M2 are controlled to implement the state where the total sum of energies at AC motors M1, M2 is zero, i.e., the DC current does not flow between DC power supply B and voltage step-up converter 12 at the time when system relays SR1, SR2 are to be cut off. The state where the DC current does not flow between DC power supply B and voltage step-up converter 12 is not restricted to the state where the DC current is zero, but includes the DC current within the range not causing meltdown and adhesion, or degradation, of the contact point of system relays SR1, SR2.

In steps S8, S9 of the flowchart shown in FIG. 7, when voltage Vc being the primary voltage of voltage step-up converter 12 is not greater than the lower limit of the operating voltage range of DC/DC converter 20, the energy balance of two AC motors M1, M2 is set to the regenerative energy to increase the regenerative amount to the capacitor C2 side so as to make voltage Vc greater than the lower limit. This is because the terminal-to-terminal voltage Vm of capacitor C2 is always greater than voltage Vc, and it is necessary to increase voltage Vm to increase voltage Vc.

As described above, the present invention is characterized in that upon detection of the fault in DC power supply B (when it is determined "No" in step S1 of FIG. 7), system relays SR1, SR2 are cut off, and control of voltage step-up converter 12 is switched to voltage step-down control (see step S111 of FIG. 7). This voltage step-down control is control to down-convert voltage Vm such that primary voltage Vc of voltage step-up converter 12 corresponds to voltage command Vdc_com_bv within the operating voltage range of DC/DC converter 20. Thus, voltage step-up converter 12 down-converts voltage Vm during the voltage step-down operation to make voltage Vc fall within the operating voltage range of DC/DC converter 20. DC/DC converter 20 resumes the operation at the start of the voltage step-down operation of voltage step-up converter 12 (see step S12 of FIG. 7), and converts the DC voltage supplied to the capacitor C1 side to charge auxiliary battery 21. As a result, application of the overvoltage to DC/DC converter 20 is prevented.

Further, the present invention is characterized in that system relays SR1, SR2 are cut off only after the energy balance of AC motors M1, M2 has become zero (see steps S3, S4 of FIG. 7), DC/DC converter 20 has been stopped (see step S5 of FIG. 7) and voltage step-up converter 12 has been stopped (see step S6 of FIG. 7). If the energy balance of AC motors M1, M2 is zero and voltage step-up converter 12 and DC/DC converter 20 are both stopped, there is no DC current flowing between DC power supply B and voltage step-up converter 12, and thus, cutting off of system relays SR1, SR2 will not cause meltdown and adhesion, or degradation, of the contact point.

Returning to FIG. 1, an overall operation in hybrid vehicle drive apparatus 100 is described. When the overall operation is started, control device 30 generates and outputs signal SE of the H level to system relays SR1, SR2 to turn them on. DC power supply B outputs the DC voltage via system relays SR1, SR2 to voltage step-up converter 12 and DC/DC converter 20.

Voltage sensor 10A detects voltage Vb output from DC power supply B, and outputs the detected voltage Vb to control device 30. Voltage sensor 13 detects terminal-to-terminal voltage Vm of capacitor C2, and outputs the detected voltage Vm to control device 30. Further, current sensor 18 detects current BCRT flowing to or from DC power supply B, and outputs the same to control device 30. Temperature sensor 10B detects and outputs temperature Tb of DC power supply B to control device 30, and voltage sensor 11 detects and outputs voltage Vc to control device 30. Current sensor 24 detects motor current MCRT1 flowing through AC motor M1, and outputs the same to control device 30. Current sensor 28 detects motor current MCRT2 flowing through AC motor M2, and outputs the same to control device 30. Control device 30 receives torque command values TR1, TR2 and motor revolution numbers MRN1, MRN2 from the external ECU.

Then, control device 30 generates signal PWMI1 in the above-described manner based on voltage Vm, motor current MCRT1 and torque command value TR1, and outputs the generated signal PWMI1 to inverter 14. Control device 30 generates signal PWMI2 in the above-described manner based on voltage Vm, motor current MCRT2 and torque command value TR2, and outputs the generated signal PWMI2 to inverter 31. Further, when inverter 14 (or 31) drives AC motor M1 (or M2), control device 30 generates signal PWMU for controlling switching of NPN transistors Q1, Q2 of voltage step-up converter 12 in the above-described manner based on voltages Vm, Vb, torque command value TR1 (or TR2) and motor revolution number MRN1 (or MRN2), and outputs the generated signal PWMU to voltage step-up converter 12.

Voltage step-up converter 12 then boosts the DC voltage from DC power supply B in response to signal PWMU, and supplies the boosted DC voltage to capacitor C2 via nodes N1, N2. Inverter 14 converts the DC voltage having been smoothed by capacitor C2 to the AC voltage in accordance with signal PWMI1 from control device 30, to drive AC motor M1. Inverter 31 converts the DC voltage smoothed by capacitor C2 to the AC voltage by signal PWMI2 from control device 30, to drive AC motor M2. Accordingly, AC motor M1 generates torque designated by torque command value TR1, and AC motor M2 generates torque designated by torque command value TR2.

Further, in the regenerative braking mode of the hybrid vehicle mounted with hybrid vehicle drive apparatus 100, control device 30 receives signal RGE from the external ECU, and, in response to the received signal RGE, generates and outputs signals PWMC1, PWMC2 to inverters 14, 31, respectively, and generates and outputs signal PWMD to voltage step-up converter 12.

Inverter 14 then converts the AC voltage generated by AC motor M1 to the DC voltage in response to signal PWMC1, and supplies the converted DC voltage via capacitor C2 to voltage step-up converter 12. Inverter 31 converts the AC voltage generated by AC motor M2 to the DC voltage in response to signal PWMC2, and supplies the converted DC voltage via capacitor C2 to voltage step-up converter 12. Voltage step-up converter 12 receives the DC voltage from capacitor C2 via nodes N1, N2, and down-converts the received DC voltage by signal PWMD, and supplies the down-converted DC voltages to DC power supply B and to DC/DC converter 20.

DC/DC converter 20 converts the DC voltage supplied from DC power supply B or voltage step-up converter 12 to charge auxiliary battery 21. This allows auxiliary battery 21 to turn on the light of the hybrid vehicle, to supply a power supply voltage to control device 30, and others.

In the normal operation mode and the regenerative braking mode of the hybrid vehicle mounted with hybrid vehicle drive apparatus 100, control device 30 determines whether there is the fault in DC power supply B based on voltage Vb from voltage sensor 10A or temperature Tb from temperature sensor 10B. When there is the fault in DC power supply B, control device 30 sets the energy balance of AC motors M1, M2 to zero and stops voltage step-up converter 12 and DC/DC converter 20 before cutting off system relays SR1, SR2. Control device 30 sets voltage command Vdc_com_bv of voltage Vc being the primary voltage of voltage step-up converter 12 to control voltage step-up converter 12 to down-convert voltage Vm to voltage Vc. Control device 30 then causes DC/DC converter 20 to resume the operation.

This can prevent the overvoltage from being applied to DC/DC converter 20 even if system relays SR1, SR2 are cut off when there is the fault in DC power supply B. Since system relays SR1, SR2 are cut off in the state where there is no DC current flowing between DC power supply B and voltage step-up converter 12, meltdown and adhesion or degradation of the contact points of system relays SR1, SR2 is avoided.

Although it has been described that AC motor M1 is a motor driving the drive wheels of the hybrid vehicle and AC motor M2 is a motor that functions as an electric power generator driven by the engine and also as an electric motor for the engine that can start the engine, the present invention is not limited thereto. AC motor M1 may be made to operate as the motor that can function as the electric power generator driven by the engine and also as the electric motor for the engine to start it, and AC motor M2 may be made to operate as the motor driving the drive wheels of the hybrid vehicle.

Further, AC motors M1, M2 may be used as series hybrid and parallel hybrid motors.

Still further, AC motor M1 may be used as a motor operating as an electric power generator/electric motor for the engine or as a drive motor driving front wheels, and AC motor M2 may be used as a drive motor driving rear wheels.

Figure 8:
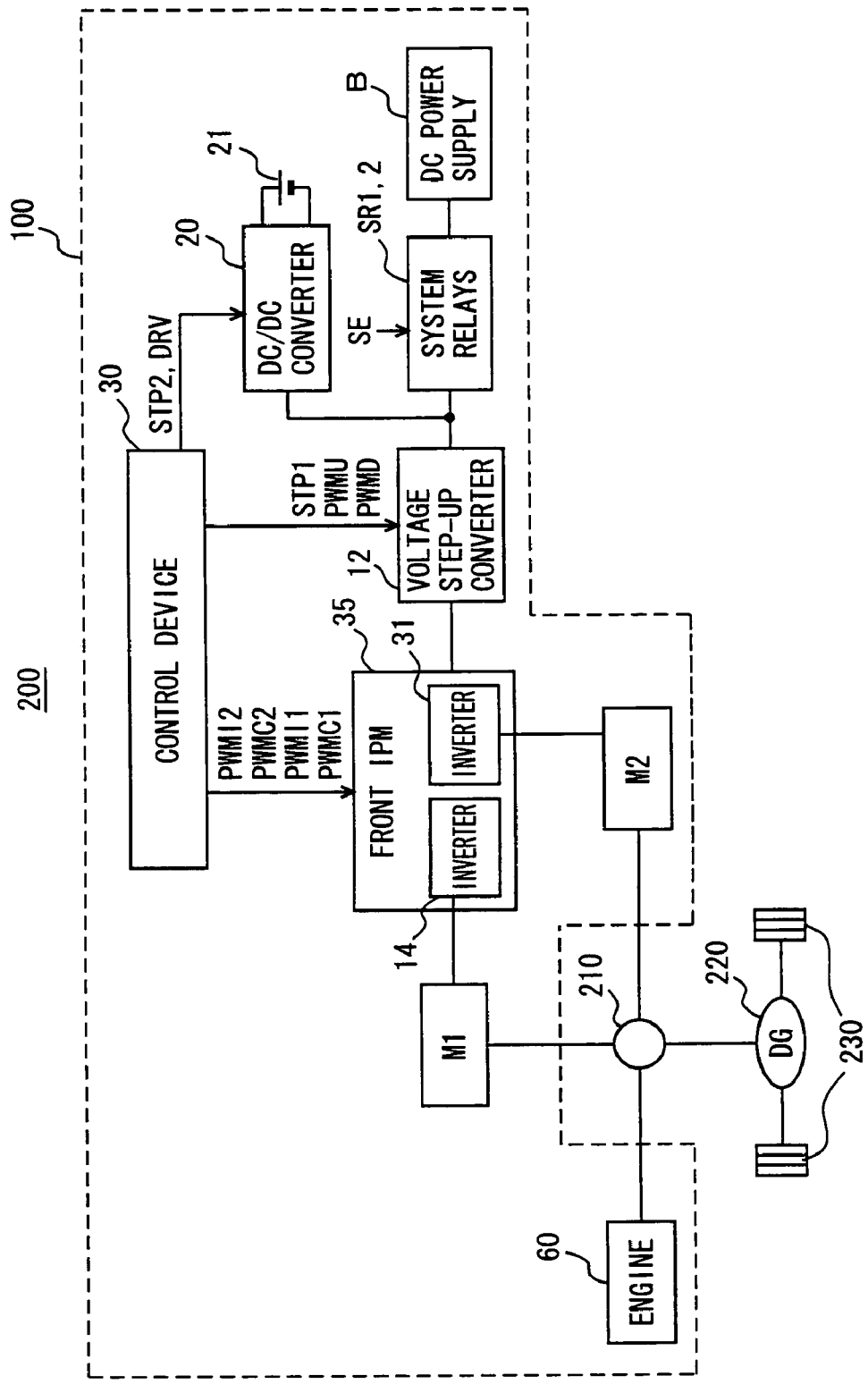
FIG. 8 is a schematic block diagram showing an example of a more specific drive system of a hybrid vehicle mounted with the hybrid vehicle drive apparatus shown in FIG. 1.

FIG. 8 is a schematic block diagram showing an example of a more specific drive system of the hybrid vehicle mounted with hybrid vehicle drive apparatus 100. Referring to FIG. 8, the drive system 200 includes hybrid vehicle drive apparatus 100, a motive power dividing mechanism 210, a differential gear (DG) 220, and front wheels 230.

60 via shaft 251, planetary carrier 253, carrier gear 212, sun gear 213 and shaft 252, and generates electric power by the received turning force.

Returning to FIG. 8, operations of drive system 200 at the time of start-up, at the start of running, in the light-load running mode, medium-speed low-load running mode, acceleration/rapid acceleration mode, low μ road running mode, and deceleration/braking mode of the hybrid vehicle mounted with drive system 200 will be described. Table 2 shows torque command values TR1, TR2 of AC motors M1, M2, signal MDE and signals PWMU, PWMD, PWMI1, PWMI2, PWMC1, PWMC2 at the time of start-up, at the start of running, in the light-load running mode, medium-speed low-load running mode, acceleration/rapid acceleration mode, low μ road running mode, and deceleration/braking mode.

TABLE 2

| State of hybrid vehicle | Signal MDE | Torque command value TR1 of AC motor M1 | Torque command value TR2 of AC motor M2 | Signal PWMU | Signal PWMD | Signal PWMI1 | Signal PWMI2 | Signal PWMC1 | Signal PWMC2 |
|---|---|---|---|---|---|---|---|---|---|
| Start-up | MDE1 | TR11 | — | PWMU11 | — | PWMI11 | — | — | — |
|  |  | TRL0 | — | — | — | PWMI10 | — | — | — |
|  |  | RGEL11 | — | — | PWMDL11 | — | — | PWMCL11 | — |
|  |  | — | — | — | PWMDL12 | — | — | — | — |
| Start of running | MDE2 | RGE11 | TR21 | PWMU21 | — | — | PWMI21 | PWMC11 | — |
|  |  | TRL0 | TRL0 | — | — | PWMI10 | PWMI20 | — | — |
|  |  | RGEL12 | TRL21 | — | PWMDL21 | — | PWMIL21 | PWMCL12 | — |
|  |  | — | — | — | PWMDL22 | — | — | — | — |
| Light-load running mode | MDE3 | — | TR22 | PWMU22 | — | — | PWMI22 | — | — |
|  |  | — | TRL0 | — | — | — | PWMI20 | — | — |
|  |  | — | RGEL21 | — | PWMDL31 | — | — | — | PWMCL21 |
|  |  | — | — | — | PWMDL32 | — | — | — | — |
| Medium-speed low-load running mode | MDE4 | TR11 | — | PWMU11 | — | PWMI11 | — | — | — |
|  |  | TRL0 | — | — | — | PWMDI10 | — | — | — |
|  |  | RGEL11 | — | — | PWMDL11 | — | — | PWMCL11 | — |
|  |  | — | — | — | PWMDL12 | — | — | — | — |
| Acceleration/ rapid acceleration mode | MDE5 | RGE12 | TR23 | PWMU23 | — | — | PWMI23 | PWMC12 | — |
|  |  | TRL0 | TRL0 | — | — | PWMI10 | PWMI20 | — | — |
|  |  | RGEL13 | TRL23 | — | PWMDL41 | — | PWMIL23 | PWMCL13 | — |
|  |  | — | — | — | PWMDL42 | — | — | — | — |
| Low μ road running mode | MDE6 | — | RGE21 | — | PWMD21 | — | — | — | PWMC21 |
|  |  | — | TRL0 | — | — | — | PWMI20 | — | — |
|  |  | — | RGEL22 | — | PWMDL51 | — | — | — | PWMCL22 |
|  |  | — | — | — | PWMDL52 | — | — | — | — |
| Deceleration/ braking mode | MDE7 | — | RGE22 | — | PWMD22 | — | — | — | PWMC22 |
|  |  | — | TRL0 | — | — | — | PWMI20 | — | — |
|  |  | — | RGEL23 | — | PWMDL61 | — | — | — | PWMCL23 |
|  |  | — | — | — | PWMDL62 | — | — | — | — |

In drive system 200, AC motors M1 and M2 correspond to front motors. Inverters 14, 31 constitute a front IPM 35.

AC motor M1 is connected to engine 60 via motive power dividing mechanism 210. AC motor M1 starts engine 60, or generates electric power by the turning force of engine 60.

AC motor M2 drives front wheels 230 via motive power dividing mechanism 210.

Figure 9:
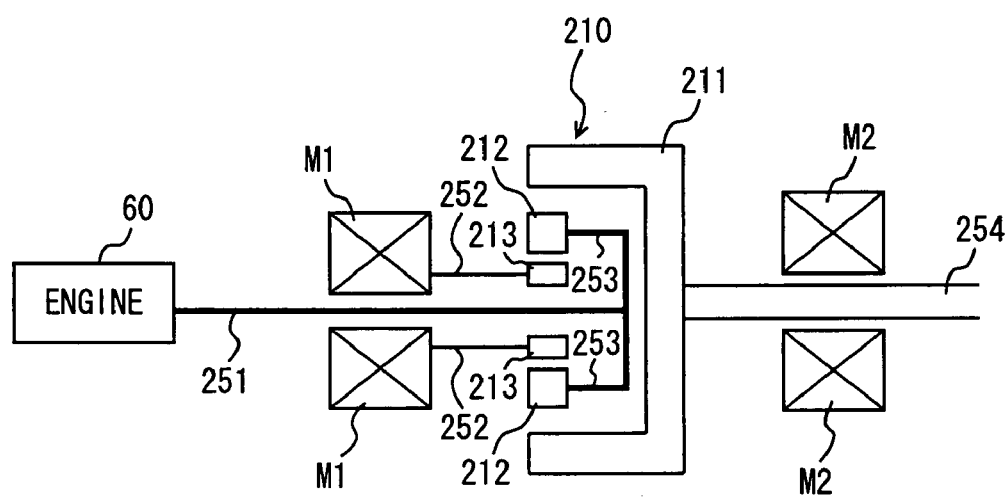
FIG. 9 schematically shows a motive power dividing mechanism shown in FIG. 8.
Figure 10:
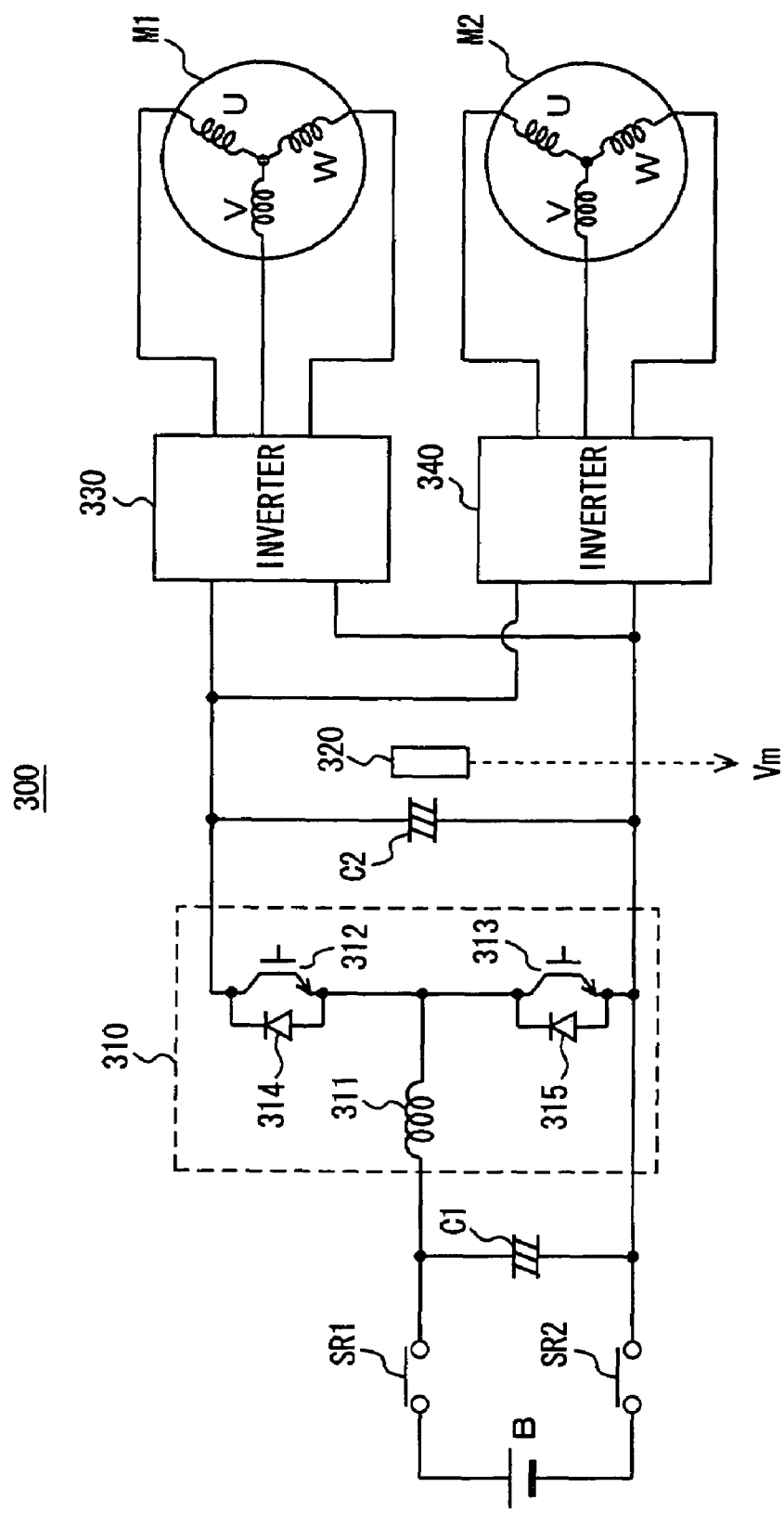
FIG. 10 is a schematic block diagram of a conventional motor drive apparatus.

FIG. 9 is a schematic diagram of motive power dividing mechanism 210 shown in FIG. 8. Referring to FIG. 9, motive power dividing mechanism 210 is comprised of a ring gear 211, a carrier gear 212, and a sun gear 213. Engine 60 has a shaft 251 connected to carrier gear 212 via a planetary carrier 253. AC motor M1 has a shaft 252 connected to sun gear 213, and AC motor M2 has a shaft 254 connected to ring gear 211. Shaft 254 of AC motor M2 is connected to the drive shaft of front wheels 230 via DG 220.

AC motor M1 rotates shaft 251 via shaft 252, sun gear 213, carrier gear 212 and planetary carrier 253, to start engine 60. AC motor M1 receives the turning force of engine In each state of the hybrid vehicle shown in Table 2, the first row indicates torque command values TR1, TR2 and signal PWMU when DC power supply B is normal, and the second through fourth rows indicate torque command values TRL0–TRL2, signal PWMU and others when there is the fault in DC power supply B.

Firstly, an operation of drive system 200 upon engine starting of the hybrid vehicle is explained. When a series of operations is started, control device 30 receives torque command value TR11 (a kind of torque command value TR1) and motor revolution number MRN1 from the external ECU. Control device 30 generates signal PWMU11 (a kind of signal PWMU) in the above-described manner based on battery voltage Vb from voltage sensor 10A, output voltage Vm from voltage sensor 13, and torque command value TR11 and motor revolution number MRN1 from the external ECU, and outputs the generated signal PWMU11 to voltage step-up converter 12. Control device 30 generates signal PWMI11 (a kind of signal PWMI1) in the above-described manner based on output voltage Vm from voltage sensor 13, motor current MCRT1 from current sensor 24 and torque command value TR11 from the external ECU, and outputs the generated signal PWMIL1 to inverter 14.

Then, NPN transistors Q1, Q2 of voltage step-up converter 12 are turned on/off by signal PWMU11, and voltage step-up converter 12 boosts battery voltage Vb in accordance with the time period during which NPN transistor Q2 is on, and supplies output voltage Vm via capacitor C2 to inverter 14. Inverter 14 converts the DC voltage from voltage step-up converter 12 to the AC voltage in accordance with signal PWMI11, and drives AC motor M1 to output torque designated by torque command value TR11.

Accordingly, AC motor M1 rotates the crankshaft of engine 60 at revolution number MRN1 via motive power dividing mechanism 210, to start engine 60.

When the fault in DC power supply B is detected upon starting of engine 60, control device 30 generates and outputs to inverter 14 signal PWMI10 to cause AC motor M1 to output the output torque=zero designated by torque command value TRL0. Inverter 14 drives AC motor M1 to output zero output torque in response to signal PWMI10. In this case, AC motor M2 is not driven to cause zero output torque, since AC motor M2 is stopped upon engine starting.

Control device 30 generates and outputs signals STP1, STP2 to voltage step-up converter 12 and DC/DC converter 20, respectively, to attain the state where no DC current flows between DC power supply B and voltage step-up converter 12. Control device 30 generates and outputs signal SE of the L level to system relays SR1, SR2, to cut them off.

Thereafter, control device 30 determines whether voltage Vc from voltage sensor 11 is not greater than the lower limit of the operating voltage range of DC/DC converter 20. When voltage Vc is not greater than the lower limit, fault processing means 302 of control device 30 detects, based on signal MDE1, that AC motor M1 is in the driving mode and AC motor M2 is stopped at the time of engine starting. Fault processing means 302 generates signal RGEL11 (a kind of signal RGEL1) for setting the total sum of energies at AC motors M1, M2 to the regenerative energy in accordance with the drive states of AC motors M1, M2, and outputs the generated signal to inverter control means 301 and to converter control means 303. Inverter control means 301 generates and outputs to inverter 14 signal PWMCL11 (a kind of signal PWMCL1) in response to signal RGEL11. Converter control means 303, in response to signal RGEL11, generates and outputs to voltage step-up converter 12 signal PWMDL 11 (a kind of signal PWMDL) for setting voltage Vc to a level higher than the lower limit.

In response to signal PWMCL11, inverter 14 drives AC motor M1 in the regenerative mode, and coverts the AC voltage generated by AC motor M1 to the DC voltage to supply to voltage step-up converter 12. Voltage step-up converter 12, in response to signal PWMDL11, down-converts the DC voltage from inverter 14 and supplies the resulting voltage to DC/DC converter 20. This makes voltage Vc higher than the lower limit. In this case, only AC motor M1 is used to produce regenerative energy to the side of DC/DC converter 20, because engine 60 has already started to rotate by AC motor M1, and generating electric power by the turning force of engine 60 is more advantageous in terms of energy efficiency.

After the output torque of AC motor M1 attains zero, or after voltage Vc becomes greater than the lower limit, control device 30 generates and outputs signal PWMDL12 to voltage step-up converter 12. In response to signal PWMDL12, voltage step-up converter 12 down-coverts voltage Vm to make voltage Vc fall within the operating voltage range of DC/DC converter 20, and supplies the resulting voltage to DC/DC converter 20. Control device 30 also generates and outputs signal DRV to DC/DC converter 20. DC/DC converter 20 resumes the operation in response to signal DRV, and converts the DC voltage supplied from voltage step-up converter 12 to charge auxiliary battery 21. This can prevent the overvoltage from being applied to DC/DC converter 20 even if there is the fault in DC power supply B upon engine starting. System relays SR1, SR2 are cut off in the state where there is no DC current flowing between DC power supply B and voltage step-up converter 12, and thus, meltdown or degradation of the contact points of system relays SR1, SR2 is avoided.

The operation of drive system 200 at the time of engine starting of the hybrid vehicle is thus completed.

An operation of drive system 200 at the start of running of the hybrid vehicle is now described. When a series of operations is started, control device 30 receives from the external ECU, signal MDE2 (a kind of signal MDE), torque command value TR21, motor revolution number MRN2, and signal RGE 11 (a kind of signal RGE) for causing AC motor M1 to function as the electric power generator by the turning force of engine 60 after starting. In this case, torque command value TR21 is one for using AC motor M2 for start of running.

Control device 30 generates signal PWMU21 in the above-described manner based on battery voltage Vb from voltage sensor 10A, output voltage Vm from voltage sensor 13, and torque command value TR21 and motor revolution number MRN2 from the external ECU, and outputs the generated signal PWMU21 to voltage step-up converter 12. Control device 30 also generates signal PWMI21 in the above-described manner based on output voltage Vm from voltage sensor 13, motor current MCRT2 from current sensor 28, and torque command value TR21 from the external ECU, and outputs the generated signal PWMI21 to inverter 31. Further, control device 30 generates and outputs to inverter 14 signal PWMC11 (a kind of signal PWMC1) in response to signal RGE11 from the external ECU.

Then, NPN transistors Q1, Q2 of voltage step-up converter 12 are turned on/off by signal PWMU21, and voltage step-up converter 12 boosts battery voltage Vb in accordance with the time period during which NPN transistor Q2 is on, and supplies output voltage Vm via capacitor C2 to inverter 31. Inverter 14 converts the AC voltage generated by AC motor M1 by means of the turning force of engine 60 to the DC voltage in accordance with signal PWMC11, and supplies the converted DC voltage to inverter 31. Inverter 31 receives the DC voltage from voltage step-up converter 12 and the DC voltage from inverter 14, and converts the received DC voltage to the AC voltage in accordance with signal PWMI21, and drives AC motor M2 to output torque designated by torque command value TR21. AC motor M2 then drives front wheels 230 via motive power dividing mechanism 210 and differential gear 220.

When the fault in DC power supply B is detected at the start of running of the hybrid vehicle, control device 30 generates signals PWMI10, PWMI20 to cause AC motors M1 and M2 to output the output torque=zero designated by torque command value TRL0, and outputs the generated signals PWMI 10, PWMI20 to inverters 14, 31, respectively. Inverter 14, in response to signal PWMI10, drives AC motor M1 to output zero output torque, and inverter 31, in response to signal PWMI20, drives AC motor M2 to output zero output torque.

Further, control device 30 generates and outputs signals STP1, STP2 to voltage step-up converter 12 and DC/DC converter 20, respectively. This ensures the state where no DC current flows between DC power supply B and voltage step-up converter 12. Control device 30 then generates and outputs signal SE of the L level to system relays SR1, SR2, to cut them off.

Thereafter, control device 30 determines whether voltage Vc from voltage sensor 11 is not greater than the lower limit of the operating voltage range of DC/DC converter 20. If voltage Vc is not greater than the lower limit, fault processing means 302 of control device 30 detects, based on signal MDE2, that AC motor M1 is in the regenerative mode and AC motor M2 is in the driving mode at the start of running. Fault processing means 302 then generates signal RGEL12 (a kind of signal RGEL1) and torque command value TRL21 (a kind of torque command value TRL2) for setting the total sum of energies at AC motors M1, M2 to the regenerative energy in accordance with the drive states of AC motors M1, M2, and outputs the generated signal RGEL12 to inverter control means 301 and to converter control means 303, and outputs the generated torque command value TRL21 to inverter control means 301.

Inverter control means 301 generates signal PWMIL21 based on torque command value TRL21 and outputs the same to inverter 31. Inverter control means 301 also generates signal PWMCL12 (a kind of signal PWMCL1) in response to signal RGEL12, and outputs the same to inverter 14. Converter control means 303 generates signal PWMDL21 (a kind of signal PWMDL) for setting voltage Vc to a level higher than the lower limit in response to signal RGEL12, and outputs the same to voltage step-up converter 12.

Inverter 14, in response to signal PWMCL12, drives AC motor M1 in the regenerative mode, and converts the AC voltage generated by AC motor M1 to the DC voltage to supply to voltage step-up converter 12 and to inverter 31. Inverter 31, in response to signal PWMIL21, coverts the DC voltage supplied from inverter 14 to the AC voltage to drive AC motor M2. Voltage step-up converter 12, in response to signal PWMDL11, down-coverts the DC voltage from inverter 14 to supply to DC/DC converter 20. As such, voltage Vc becomes higher than the lower limit.

After the output torque of AC motors M1 and M2 become zero, or after voltage Vc becomes greater than the lower limit, control device 30 generates and outputs signal PWMDL22 to voltage step-up converter 12. Voltage step-up converter 12, in response to signal PWMDL22, down-converts voltage Vm to make voltage Vc fall within the operating voltage range of DC/DC converter 20, and supplies the resulting voltage to DC/DC converter 20. Control device 30 generates and outputs signal DRV to DC/DC converter 20. DC/DC converter 20 resumes the operation in response to signal DRV, and converts the DC voltage supplied from voltage step-up converter 12 to charge auxiliary battery 21. This can prevent the overvoltage from being applied to DC/DC converter 20 even if there is the fault in DC power supply B at the start of running of the hybrid vehicle. System relays SR1, SR2 are cut off in the state where there is no DC current flowing between DC power supply B and voltage step-up converter 12, and thus, meltdown or degradation of the contact points of system relays SR1, SR2 is avoided.

The operation of drive system 200 at the start of running of the hybrid vehicle is thus completed.

An operation of drive system 200 in the light-load running mode of the hybrid vehicle is now described. When a series of operations is started, control device 30 receives signal MDE3 (a kind of signal MDE), torque command value TR22 (a kind of torque command value TR2) and motor revolution number MRN2 from the external ECU. Torque command value TR22 is one for driving front wheels 230 of the hybrid vehicle by only AC motor M2.

Control device 30 generates signal PWMU22 (a kind of signal PWMU) in the above-described manner based on battery voltage Vb from voltage sensor 10A, output voltage Vm from voltage sensor 13, and torque command value TR22 and motor revolution number MRN2 from the external ECU, and outputs the generated signal PWMU22 to voltage step-up converter 12. Control device 30 also generates signal PWMI22 (a kind of signal PWMU2) in the above-described manner based on output voltage Vm from voltage sensor 13, motor current MCRT2 from current sensor 28, and torque command value TR22 from the external ECU, and outputs the generated signal PWMI22 to inverter 31.

Then, NPN transistors Q1, Q2 of voltage step-up converter 12 are turned on/off by signal PWMU22. Voltage step-up converter 12 boosts battery voltage Vb in accordance with the time period during which NPN transistor Q2 is on, and supplies output voltage Vm via capacitor C2 to inverter 31. Inverter 31 converts the DC voltage from voltage step-up converter 12 to the AC voltage in response to signal PWMI22, and drives AC motor M2 to output torque designated by torque command value TR22. AC motor M2 drives front wheels 230 via motive power dividing mechanism 210 and differential gear 220, so that the hybrid vehicle enters the light-load running mode by AC motor M2.

When the fault in DC power supply B is detected when the hybrid vehicle is in the light-load running mode, control device 30 generates and outputs to inverter 31 signal PWMI20 to cause AC motor M2 to output the output torque=zero designated by torque command value TRL0. Inverter 31, in response to signal PWMI20, drives AC motor M2 to output zero output torque. In this case, AC motor M1 is not driven to cause zero output torque, since AC motor M1 is stopped in the light-load running mode.

Control device 30 also generates and outputs signals STP1, STP2 to voltage step-up converter 12 and DC/DC converter 20, respectively. This ensures the state where there is no DC current flowing between DC power supply B and voltage step-up converter 12. Control device 30 generates and outputs signal SE of the L level to system relays SR1, SR2 to cut them off.

Thereafter, control device 30 determines whether voltage Vc from voltage sensor 11 is not greater than the lower limit of the operating voltage range of DC/DC converter 20. If voltage Vc is not greater than the lower limit, fault processing means 302 of control device 30 detects that AC motor M1 is stopped and AC motor M2 is in the driving mode in the light-load running mode, based on signal MDE3. Fault processing means 302 generates signal RGEL21 (a kind of RGEL2) for setting the total sum of energies at AC motors M1, M2 to the regenerative energy in accordance with the drive states of AC motors M1, M2, and outputs the generated signal RGEL21 to inverter control means 301 and to converter control means 303.

Inverter control means 301, in response to signal RGEL21, generates and outputs signal PWMCL21 (a kind of signal PWMCL2) to inverter 31. Converter control means 303, in response to signal RGEL21, generates and outputs signal PWMDL31 (a kind of signal PWMDL) for setting voltage Vc to the level higher than the lower limit, to voltage step-up converter 12.

Consequently, inverter 31, in response to signal PWMCL21, drives AC motor M2 in the regenerative mode, and converts the AC voltage generated by AC motor M2 to the DC voltage to supply to voltage step-up converter 12. Voltage step-up converter 12, in response to signal PWMDL31, down-converts the DC voltage from inverter 31 to supply to DC/DC converter 20. As such, voltage Vc becomes greater than the lower limit.

After the output torque of AC motor M2 attains zero, or after voltage Vc becomes greater than the lower limit, control device 30 generates and outputs signal PWMDL32 to voltage step-up converter 12. Voltage step-up converter 12, in response to signal PWMDL32, down-coverts voltage Vm to make voltage Vc fall within the operating voltage range of DC/DC converter 20, and outputs the resulting voltage to DC/DC converter 20. Control device 30 generates and outputs signal DRV to DC/DC converter 20. DC/DC converter 20 resumes the operation in response to signal DRV, and converts the DC voltage supplied from voltage step-up converter 12 to charge auxiliary battery 21. This can prevent the overvoltage from being applied to DC/DC converter 20 even if there is the fault in DC power supply B in the light-load running mode of the hybrid vehicle. System relays SR1, SR2 are cut off in the state where there is no DC current flowing between DC power supply B and voltage step-up converter 12, and thus, meltdown or degradation of the contact points of system relays SR1, SR2 is avoided.

The operation of drive system 200 in the light-load running mode of the hybrid vehicle is thus completed.

An operation of drive system 200 in the medium-speed low-load running mode of the hybrid vehicle is now described. The operation of drive system 200 in this case is similar to that upon starting of engine 60 of the hybrid vehicle described above. AC motor M1 starts engine 60, and the hybrid vehicle runs with the driving force of engine 60. Control device 30 receives signal MDE4 (a kind of signal MDE) from the external ECU in the medium-speed low-load running mode, and detects that AC motor M1 is in the driving mode and AC motor M2 is stopped in the medium-speed low-load running mode, based on the received signal MDE4.

An operation of drive system 200 in the acceleration/rapid acceleration mode of the hybrid vehicle is now described. When a series of operations is started, control device 30 receives, from the external ECU, signal MDE5 (a kind of signal MDE), torque command value TR23, motor revolution number MRN2, and signal RGE12 (a kind of signal RGE) for making AC motor M1 function as the electric power generator. Torque command value TR23 is one for using AC motor M2 for acceleration/rapid acceleration.

Control device 30 generates signal PWMU23 in the above-described manner based on battery voltage Vb from voltage sensor 10A, output voltage Vm from voltage sensor 13, and torque command value TR23 and motor revolution number MRN2 from the external ECU, and outputs the generated signal PWMU23 to voltage step-up converter 12. Control device 30 also generates signal PWMI23 in the above-described manner based on output voltage Vm from voltage sensor 13, motor current MCRT2 from current sensor 28, and torque command value TR23 from the external ECU, and outputs the generated signal PWMI23 to inverter 31. Further, control device 30 generates and outputs to inverter 14 signal PWMC12 (a kind of signal PWMC1) in response to signal RGE 12 from the external ECU.

Then, NPN transistors Q1, Q2 of voltage step-up converter 12 are turned on/off by signal PWMU23. Voltage step-up converter 12 boosts battery voltage Vb in accordance with the time period during which NPN transistor Q2 is on, and supplies output voltage Vm via capacitor C2 to inverter 31. Inverter 14 converts the AC voltage generated by AC motor M1 by means of the turning force of engine 60 (the number of revolutions of engine 60 is larger than before acceleration) to the DC voltage in accordance with signal PWMC12, and supplies the converted DC voltage to inverter 31. Inverter 31 receives the DC voltage from voltage step-up converter 12 and the DC voltage from inverter 14, and converts the received DC voltage to the AC voltage in response to signal PWMI23, and drives AC motor M2 to output torque designated by torque command value TR23.

At the time of acceleration/rapid acceleration, the output of engine 60 is increased. Engine 60 and AC motor M2 drive front wheels 230 via motive power dividing mechanism 210 and differential gear 220, to accelerate or rapid-accelerate the hybrid vehicle.

When the fault in DC power supply B is detected while the hybrid vehicle is in the light-load running mode, control device 30 generates signals PWMI10 and PWMI20 to cause AC motors M1, M2 to output the output torque=zero designated by torque command value TRL0, and outputs the generated signals PWMI10, PWMI20 to inverters 14, 31, respectively. Inverter 14, in response to signal PWMI10, drives AC motor M1 to output zero output torque. Inverter 31, in response to signal PWMI20, drives AC motor M2 to output zero output torque.

Control device 30 also generates and outputs signals STP1, STP2 to voltage step-up converter 12 and DC/DC converter 20, respectively. This ensures the state where there is no DC current flowing between DC power supply B and voltage step-up converter 12. Control device 30 generates and outputs signal SE of the L level to system relays SR1, SR2 to cut them off.

Thereafter, control device 30 determines whether voltage Vc from voltage sensor 11 is not greater than the lower limit of the operating voltage range of DC/DC converter 20. If voltage Vc is not greater than the lower limit, fault processing means 302 of control device 30 detects that AC motor M1 is in the regenerative mode and AC motor M2 is in the driving mode in the acceleration/rapid acceleration mode, based on signal MDE5. Fault processing means 302 then generates signal RGEL13 (a kind of signal RGEL1) and torque command value TRL23 (a kind of torque command value TRL2) for setting the total sum of energies at AC motors M1, M2 to the regenerative energy in accordance with the drive states of AC motors M1, M2, and outputs the generated signal RGEL23 to inverter control means 301 and to converter control means 303, and outputs the generated torque command value TRL23 to inverter control means 301.

Inverter control means 301 generates signal PWMCL13 (a kind of signal PWMCL1) in response to signal RGEL13, and outputs the generated signal to inverter 14. Inverter control means 301 also generates signal PWMI23 (a kind of signal PWMI2) based on torque command value TRL23, and outputs the generated signal to inverter 31. Converter control means 303 generates signal PWMDL41 (a kind of signal PWMDL) for setting voltage Vc to the level higher than the lower limit in response to signal RGEL13, and outputs the generated signal to voltage step-up converter 12.

Inverter 14, in response to signal PWMCL13, drives AC motor M1 in the regenerative mode, and converts the AC voltage generated by AC motor M1 to the DC voltage to supply to voltage step-up converter 12 and to inverter 31. Inverter 31, in response to signal PWMIL23, coverts the DC voltage from inverter 14 to the AC voltage, to drive AC motor M2 to output torque designated by torque command value TRL23. Voltage step-up converter 12, in response to signal PWMDL41, down-coverts the DC voltage from inverter 14 to supply to DC/DC converter 20. As such, voltage Vc becomes higher than the lower limit.

After the output torque of AC motors M1, M2 become zero, or after voltage Vc becomes greater than the lower limit, control device 30 generates and outputs signal PWMDL42 to voltage step-up converter 12. Voltage step-up converter 12, in response to signal PWMDL42, down-converts voltage Vm to make voltage Vc fall within the operating voltage range of DC/DC converter 20, and supplies the resulting voltage to DC/DC converter 20. Control device 30 generates and outputs signal DRV to DC/DC converter 20. DC/DC converter 20 resumes the operation in response to signal DRV, and converts the DC voltage supplied from voltage step-up converter 12 to charge auxiliary battery 21. This can prevent the overvoltage from being applied to DC/DC converter 20 even if there is the fault in DC power supply B in the acceleration/rapid acceleration mode of the hybrid vehicle. System relays SR1, SR2 are cut off in the state where there is no DC current flowing between DC power supply B and voltage step-up converter 12, and thus, meltdown or degradation of the contact points of system relays SR1, SR2 is avoided.

The operation of drive system 200 in the acceleration/rapid acceleration mode of the hybrid vehicle is thus completed.

An operation of drive system 200 while the hybrid vehicle is in the low $\mu$ road running mode is now described. When a series of operations is started, control device 30 receives signal MDE6 (a kind of signal MDE) and signal RGE21 (a kind of signal RGE) from the external ECU. Signal RGE21 is one for driving AC motor M2 in the regenerative mode.

Control device 30 generates signal PWMD21 (a kind of PWMD) in response to signal RGE21 from the external ECU, and outputs the generated signal PWMD21 to voltage step-up converter 12. Control device 30 also generates signal PWMC21 (a kind of signal PWMC2) in response to signal RGE21 from the external ECU, and outputs the generated signal PWMC21 to inverter 31.

In this low $\mu$ road running mode, engine 60 drives front wheels 230, and part of the driving force of front wheels 230 is transmitted to AC motor M2.

Inverter 31, in response to signal PWMC21, drives AC motor M2 in the regenerative mode, and converts the AC voltage generated by AC motor M2 receiving part of the driving force of front wheels 230 to the DC voltage, to supply to voltage step-up converter 12. Voltage step-up converter 12 down-converts the DC voltage from inverter 31 by signal PWMD21, and supplies the resulting voltage to DC power supply B.

When the fault of DC power supply B is detected while the hybrid vehicle is in the low $\mu$ road running mode, control device 30 generates signal PWMI20 to cause AC motor M2 to output the output torque=zero designated by torque command value TRL0, and outputs the generated signal PWMI20 to inverter 31. Inverter 31, in response to signal PWMI20, drives AC motor M2 to output zero output torque. In this case, AC motor M1 is not driven to cause zero output torque, since AC motor M1 is stopped in the low $\mu$ road running mode.

Control device 30 generates and outputs signals STP1, STP2 to voltage step-up converter 12 and DC/DC converter 20, respectively. This ensures the state where there is no DC current flowing between DC power supply B and voltage step-up converter 12. Control device 30 then generates and outputs signal SE of the L level to system relays SR1, SR2 to cut them off.

Thereafter, control device 30 determines whether voltage Vc from voltage sensor 11 is not greater than the lower limit of the operating voltage range of DC/DC converter 20. If voltage Vc is not greater than the lower limit, fault processing means 302 of control device 30 detects that AC motor M1 is stopped and AC motor M2 is in the driving mode in the low $\mu$ road running mode, based on signal MDE6. Fault processing means 302 then generates signal RGEL22 (a kind of signal RGEL2) for setting the total sum of energies at AC motors M1, M2 to the regenerative energy in accordance with the drive states of AC motors M1, M2, and outputs the generated signal RGEL22 to inverter control means 301 and to converter control means 303.

Inverter control means 301 generates signal PWMCL22 (a kind of signal PWMCL2) in response to signal RGEL22, and outputs the generated signal to inverter 31. Converter control means 303 generates signal PWMDL51 (a kind of signal PWMDL) for setting voltage Vc to the level higher than the lower limit in response to signal RGEL22, and outputs the resulting signal to voltage step-up converter 12.

Inverter 31, in response to signal PWMCL22, drives AC motor M2 in the regenerative mode, and converts the AC voltage generated by AC motor M2 to the DC voltage to supply to voltage step-up converter 12. Voltage step-up converter 12, in response to signal PWMDL51, down-coverts the DC voltage from inverter 31 to supply to DC/DC converter 20. As such, voltage Vc becomes higher than the lower limit.

After the output torque of AC motor M2 becomes zero, or after voltage Vc becomes greater than the lower limit, control device 30 generates and outputs signal PWMDL52 to voltage step-up converter 12. Voltage step-up converter 12, in response to signal PWMDL52, down-converts voltage Vm to make voltage Vc fall within the operating voltage range of DC/DC converter 20, and supplies the resulting voltage to DC/DC converter 20. Control device 30 generates and outputs signal DRV to DC/DC converter 20. DC/DC converter 20 resumes the operation in response to signal DRV, and converts the DC voltage supplied from voltage step-up converter 12 to charge auxiliary battery 21. This can prevent the overvoltage from being applied to DC/DC converter 20 even if there is the fault in DC power supply B in the low $\mu$ road running mode of the hybrid vehicle. System relays SR1, SR2 are cut off in the state where there is no DC current flowing between DC power supply B and voltage step-up converter 12, and thus, meltdown or degradation of the contact points of system relays SR1, SR2 is avoided.

The operation of drive system 200 in the low $\mu$ road running mode of the hybrid vehicle is thus completed.

Lastly, an operation of drive system 200 while the hybrid vehicle is in the deceleration/braking mode is explained. When a series of operations is started, control device 30 receives signal RGE22 (a kind of signal RGE) and signal MDE7 (a kind of signal MDE) from the external ECU. Control device 30 generates signal PWMC22 in response to signal RGE22, and outputs the generated signal PWMC22 to inverter 31. Control device 30 also generates signal PWMD22 (a kind of signal PWMD) in response to signal RGE22, and outputs the generated signal PWMD22 to voltage step-up converter 12.

Inverter 31, in response to signal PWMC22, drives AC motor M2 in the regenerative mode, and coverts the AC voltage generated by AC motor M2 to the DC voltage to supply to voltage step-up converter 12. Voltage step-up converter 12, in response to signal PWMD22, down-converts the DC voltage from inverter 31 to supply to DC power supply B. Accordingly, the hybrid vehicle performs deceleration/braking by the regenerative braking of AC motor M2.

When the fault in DC power supply B is detected while the hybrid vehicle is in the deceleration/braking mode, control device 30 generates signal PWMI20 to cause AC motor M2 to output the output torque=zero designated by torque command value TRL0, and outputs the generated signal PWMI20 to inverter 31. Inverter 31, in response to signal PWMI20, drives AC motor M2 to output zero output torque. In this case, AC motor M1 is not driven to cause zero output torque, since AC motor M1 is stopped in the deceleration/braking mode.

Control device 30 generates and outputs signals STP1, STP2 to voltage step-up converter 12 and DC/DC converter 20, respectively. This ensures the state where there is no DC current flowing between DC power supply B and voltage step-up converter 12. Control device 30 generates and outputs signal SE of the L level to system relays SR1, SR2 to cut them off.

Thereafter, control device 30 determines whether voltage Vc from voltage sensor 11 is not greater than the lower limit of the operating voltage range of DC/DC converter 20. If voltage Vc is not greater than the lower limit, fault processing means 302 of control device 30 detects that AC motor M1 is stopped and AC motor M2 is in the regenerative mode in the deceleration/braking mode, based on signal MDE7. Fault processing means 302 then generates signal RGEL23 (a kind of signal RGEL2) for setting the total sum of energies at AC motors M1, M2 to the regenerative energy in accordance with the drive states of AC motors M1, M2, and outputs the generated signal RGEL23 to inverter control means 301 and to converter control means 303.

Inverter control means 301 generates signal PWMCL23 (a kind of signal PWMCL2) in response to signal RGEL23, and outputs the generated signal to inverter 31. Converter control means 303 generates signal PWMDL61 (a kind of signal PWMDL) for setting voltage Vc to the level higher than the lower limit in response to signal RGEL23, and outputs the generated signal to voltage step-up converter 12.

Inverter 31, in response to signal PWMCL23, drives AC motor M2 in the regenerative mode, and converts the AC voltage generated by AC motor M2 to the DC voltage to supply to voltage step-up converter 12. Voltage step-up converter 12, in response to signal PWMDL61, down-coverts the DC voltage from inverter 31 to supply to DC/DC converter 20. As such, voltage Vc becomes higher than the lower limit.

After the output torque of AC motor M2 becomes zero, or after voltage Vc becomes greater than the lower limit, control device 30 generates and outputs signal PWMDL62 to voltage step-up converter 12. Voltage step-up converter 12, in response to signal PWMDL62, down-converts voltage Vm to make voltage Vc fall within the operating voltage range of DC/DC converter 20, and supplies the resulting voltage to DC/DC converter 20. Control device 30 generates and outputs signal DRV to DC/DC converter 20. DC/DC converter 20 resumes the operation in response to signal DRV, and converts the DC voltage supplied from voltage step-up converter 12 to charge auxiliary battery 21. This can prevent the overvoltage from being applied to DC/DC converter 20 even if there is the fault in DC power supply B in the deceleration/braking mode of the hybrid vehicle. System relays SR1, SR2 are cut off in the state where there is no DC current flowing between DC power supply B and voltage step-up converter 12, and thus, meltdown or degradation of the contact points of system relays SR1, SR2 is avoided.

The operation of drive system 200 in the deceleration/braking mode of the hybrid vehicle is thus completed.

As described above, in each state of the hybrid vehicle, system relays SR1, SR2 are cut off and control of voltage step-up converter 12 is switched to the voltage step-down control upon detection of the fault in DC power supply B. System relays SR1, SR2 are cut off in the state where there is no DC current flowing between DC power supply B and voltage step-up converter 12.

Accordingly, in each state of the hybrid vehicle, application of the overvoltage to DC/DC converter 20 is avoided even if DC power supply B suffers the fault. Meltdown and adhesion or degradation of the contact points of system relays SR1, SR2 is also prevented.

In hybrid vehicle drive apparatus 100, DC power supply B, voltage sensors 110A, 11, 13, temperature sensor 10B, system relays SR1, SR2, capacitors C1, C2, voltage step-up converter 12, inverters 14, 31, current sensors 18, 24, 28, DC/DC converter 20, auxiliary battery 21, and control device 30 constitute the "motor drive apparatus".

Although DC/DC converter 20 is connected between DC power supply B and voltage step-up converter 12 in the above description, the present invention is not limited thereto. All that is needed is that an electric load is connected between DC power supply B and voltage step-up converter 12. The upper limit described above is set to a withstand voltage of parts of the electric load.

Further, in the present invention, control of hybrid vehicle drive apparatus 100 upon the fault in DC power supply B is in fact performed by a CPU (Central Processing Unit). The CPU reads out of a ROM (Read Only Memory) a program including the steps in the flowchart of FIG. 7, and executes the read program to control hybrid vehicle drive apparatus 100 upon the fault in DC power supply B according to the flowchart of FIG. 7. Thus, the ROM corresponds to the computer (CPU) readable recording medium recorded with a program including the steps in the flowchart of FIG. 7.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a motor drive apparatus that prevents the overvoltage from being applied to an electric load connected to the primary side of a voltage converter performing voltage conversion, in the event of the fault in a DC power supply.

What is claimed is:

1. A motor drive apparatus, comprising:
a first inverter driving a first motor;
a second inverter driving a second motor;
a DC power supply outputting a DC voltage;
a voltage converter boosting and supplying the DC voltage from said DC power supply to said first and second inverters, and down-converting and supplying the DC voltage from said first or second inverter to the side of said DC power supply;
a relay connected between said DC power supply and said voltage converter;
an electric load connected between said relay and said voltage converter; and
a control device cutting off said relay and switching control of said voltage converter to voltage step-down control in response to detection of a fault in said DC power supply.

2. The motor drive apparatus according to claim 1, wherein said control device controls said first and second inverters to cause a total sum of first energy at said first motor and second energy at said second motor to be zero, and cuts off said relay when said electric load and said voltage converter are stopped.

3. The motor drive apparatus according to claim 2, wherein said control device controls said first and second inverters to cause said first and second energies to be zero.

4. The motor drive apparatus according to claim 2, wherein said control device sets a duty ratio with which a primary voltage of said voltage converter corresponding to its voltage on the side of said DC power supply is not greater than an upper limit, to switch the control of said voltage converter to the voltage step-down control.

5. The motor drive apparatus according to claim 4, wherein said upper limit corresponds to a withstand voltage of parts of said electric load.

6. The motor drive apparatus according to claim 4, wherein said control device sets a duty ratio with which said primary voltage falls within a range of an operating voltage of said electric load, to switch the control of said voltage converter to the voltage step-down control.

7. The motor drive apparatus according to claim 2, wherein
the range of said operating voltage has a lower limit and said upper limit, and
when said primary voltage is lower than said lower limit, said control device controls said first and second inverters to cause a total sum of said first energy and said second energy to be regenerative energy.

8. The motor drive apparatus according to claim 7, wherein said electric load is a DC/DC converter that converts and supplies the DC voltage from said DC power supply to an auxiliary battery.

9. A hybrid vehicle drive apparatus for driving a hybrid vehicle, comprising:
an internal combustion engine;
a first motor connected to said internal combustion engine;
a second motor; and
a motor drive apparatus driving said first and second motors,
said motor drive apparatus including
a first inverter driving said first motor,
a second inverter driving said second motor,
a DC power supply outputting a DC voltage,
a voltage converter boosting and supplying the DC voltage from said DC power supply to said first and second inverters, and down-converting and supplying the DC voltage from said first or second inverter to the side of said DC power supply,
a relay connected between said DC power supply and said voltage converter,
an electric load connected between said relay and said voltage converter, and
a control device cutting off said relay and switching control of said voltage converter to voltage step-down control in response to detection of a fault in said DC power supply,
said control device driving said first and second inverters so as to drive said second motor by electric power generated by said first motor in accordance with a running mode of said hybrid vehicle.

10. A computer readable recording medium recorded with a program for causing a computer to perform control of a motor drive apparatus in the event of a fault in a DC power supply,
said motor drive apparatus including
a first inverter driving a first motor,
a second inverter driving a second motor,
said DC power supply outputting a DC voltage,
a voltage converter boosting and supplying the DC voltage from said DC power supply to said first and second inverters, and down-converting and supplying the DC voltage from said first or second inverter to the side of said DC power supply,
a relay connected between said DC power supply and said voltage converter, and
an electric load connected between said relay and said voltage converter,
said program causing the computer to perform
a first step of detecting a fault in said DC power supply,
a second step of cutting off said relay in response to detection of the fault in said DC power supply, and
a third step of switching control of said voltage converter to voltage step-down control in response to cutting off of said relay.

11. The computer readable recording medium recorded with a program for causing a computer to perform control according to claim 10, wherein
said second step includes
a first sub-step of controlling said first and second inverters to cause a total sum of first energy at said first motor and second energy at said second motor to be zero,
a second sub-step of stopping said voltage converter,
a third sub-step of stopping said electric load, and
a fourth sub-step of cutting off said relay after completion of said first, second and third sub-steps.

12. The computer readable recording medium recorded with a program for causing a computer to perform control according to claim 11, wherein said first sub-step causes said first and second energies to be zero.

13. The computer readable recording medium recorded with a program for causing a computer to perform control according to claim 10, wherein
said third step includes
a fifth sub-step of calculating a duty ratio for setting a primary voltage of said voltage converter corresponding to its voltage on the side of said DC power supply to not greater than an upper limit, and
a sixth sub-step of controlling said voltage converter based on said calculated duty ratio.

14. The computer readable recording medium recorded with a program for causing a computer to perform control according to claim 13, wherein said fifth sub-step calculates the duty ratio with which said primary voltage falls within a range of an operating voltage of said electric load.

15. The computer readable recording medium recorded with a program for causing a computer to perform control according to claim 13, wherein
the range of said operating voltage has a lower limit and said upper limit, and
said third step further includes
a seventh sub-step of determining whether said primary voltage is not greater than said lower limit, and
an eighth sub-step of controlling said first and second inverters to cause a total sum of said first and second energies to be regenerative energy when said primary voltage is not greater than said lower limit.

* * * * *